United States Patent
Yamazaki et al.

(10) Patent No.: US 11,319,018 B2
(45) Date of Patent: May 3, 2022

(54) CONTROL SYSTEM FOR HUMAN-POWERED VEHICLE

(71) Applicant: Shimano Inc., Osaka (JP)

(72) Inventors: Azusa Yamazaki, Osaka (JP); Satoshi Shahana, Osaka (JP); Kazutaka Niki, Osaka (JP); Takehiko Nakajima, Osaka (JP)

(73) Assignee: Shimano Inc., Osaka (JP)

( * ) Notice: Subject to any disclaimer, the term of this patent is extended or adjusted under 35 U.S.C. 154(b) by 366 days.

(21) Appl. No.: 16/661,312

(22) Filed: Oct. 23, 2019

(65) Prior Publication Data

US 2020/0130777 A1    Apr. 30, 2020

(30) Foreign Application Priority Data

Oct. 30, 2018  (JP) ............................... JP2018-203996

(51) Int. Cl.
| | |
|---|---|
| B62M 6/45 | (2010.01) |
| B62M 6/55 | (2010.01) |
| B62M 25/08 | (2006.01) |
| B62J 45/00 | (2020.01) |
| B62J 99/00 | (2020.01) |

(52) U.S. Cl.
CPC ............... B62M 6/45 (2013.01); B62J 99/00 (2013.01); B62M 6/55 (2013.01); B62M 25/08 (2013.01); B62J 45/00 (2020.02)

(58) Field of Classification Search
CPC ... B62M 6/55; B62M 6/45; B62M 6/50; B62J 45/00
See application file for complete search history.

(56) References Cited

U.S. PATENT DOCUMENTS

| | | | | |
|---|---|---|---|---|
| 8,812,226 B2* | 8/2014 | Zeng | ...................... | G01S 13/931 |
| | | | | 701/301 |
| 10,974,725 B2* | 4/2021 | Tsuchiya | ............. | B60W 30/181 |
| 2012/0078500 A1* | 3/2012 | Yamada | ................ | B60W 50/14 |
| | | | | 701/301 |
| 2015/0291254 A1* | 10/2015 | Lee | .......................... | B60L 50/20 |
| | | | | 180/206.3 |
| 2016/0339914 A1 | 11/2016 | Habu et al. | | |
| 2017/0190335 A1* | 7/2017 | Gillett | .................... | B62K 21/12 |
| 2018/0001952 A1* | 1/2018 | Rajamani | ................. | B62J 45/20 |

(Continued)

FOREIGN PATENT DOCUMENTS

| | | |
|---|---|---|
| CN | 107600250 A | 1/2018 |
| CN | 108001601 A | 5/2018 |
| JP | 10-81156 A | 3/1998 |

(Continued)

*Primary Examiner* — Tony H Winner
*Assistant Examiner* — Michael R Stabley
(74) *Attorney, Agent, or Firm* — Global IP Counselors, LLP

(57) ABSTRACT

A control system is provided to improve riding comfort of a human-powered vehicle. The control system includes an electronic controller and a receiver. The electronic controller is configured to control a first electric component of a first human-powered vehicle. The receiver is configured to receive first reference information related to a vehicle that differs from the first human-powered vehicle. The electronic controller is configured to control the first electric component based on the first reference information.

17 Claims, 8 Drawing Sheets

(56) References Cited

U.S. PATENT DOCUMENTS

2018/0326981 A1* 11/2018 Nakamura ............ B60W 10/20
2019/0250619 A1* 8/2019 Gillett .................. H04W 76/14

FOREIGN PATENT DOCUMENTS

| JP | 10-162299 A | 6/1998 |
| JP | 10-511621 A | 11/1998 |
| JP | 2005-165643 A | 6/2005 |
| JP | 2006-24104 A | 1/2006 |
| JP | 2009-113517 A | 5/2009 |
| JP | 2016-70901 A | 5/2016 |
| JP | 2016-215761 A | 12/2016 |
| JP | 2018-118710 A | 8/2018 |

* cited by examiner

CONTROL SYSTEM FOR HUMAN-POWERED VEHICLE

CROSS-REFERENCE TO RELATED APPLICATIONS

This application claims priority to Japanese Patent Application No. 2018-203996, filed on Oct. 30, 2019. The entire disclosure of Japanese Patent Application No. 2018-203996 is hereby incorporated herein by reference.

BACKGROUND

Technical Field

The present invention generally relates to a control system for a human-powered vehicle.

Background Information

A known control system automatically controls an electric component of a human-powered vehicle. The electric component includes, for example, a transmission. A typical control system controls the transmission so that the rotational speed of the crank of the human-powered vehicle is maintained in a predetermined range in accordance with a transmission condition determined based on the rotational speed of the crank and a threshold value. Japanese Laid-Open Patent Publication No. 10-511621 (Patent document 1) discloses an example of a typical control system.

SUMMARY

It is desirable that the rider can ride a human-powered vehicle comfortably. One object of the present disclosure is to provide a control system that improve riding comfort of a human-powered vehicle.

A control system according to a first aspect of the present disclosure comprises an electronic controller and a receiver. The electronic controller is configured to control a first electric component of a first human-powered vehicle. The receiver is configured to receive first reference information related to a vehicle that differs from the first human-powered vehicle. The electronic controller is configured to control the first electric component based on the first reference information.

With the control system according to the first aspect, the first electric component is controlled based on the first reference information. Thus, control is performed in accordance with a change in the condition of the vehicle. This improves the riding comfort of the first human-powered vehicle.

In accordance with a second aspect of the present disclosure, the control device according to the first aspect is configured so that the vehicle is a vehicle traveling ahead of the first human-powered vehicle.

With the control system according to the second aspect, the first electric component is controlled in accordance with a change in the condition of the vehicle traveling ahead of the first human-powered vehicle. Thus, control is promptly performed in accordance with the change in the condition of the first human-powered vehicle. This improves the riding comfort of the first human-powered vehicle. The vehicle traveling ahead of the first human-powered vehicle can be used as a sensor that detects information used for controlling the first electric component. Thus, a sensor can be omitted from the first human-powered vehicle.

In accordance with a third aspect of the present disclosure, the control system according to the second aspect is configured so that the vehicle includes a second human-powered vehicle.

With the control system according to the third aspect, the first electric component is controlled in accordance with a change in the condition of the second human-powered vehicle. This improves the riding comfort of the first human-powered vehicle.

In accordance with a fourth aspect of the present disclosure, the control system according to the third aspect is configured so that the first electric component includes at least one of a transmission, a suspension, an adjustable seatpost, an electric assist unit, and a brake device.

With the control system according to the fourth aspect, various first electric components can be controlled in accordance with a change in the condition of the second human-powered vehicle. This improves the riding comfort of the first human-powered vehicle.

In accordance with a fifth aspect of the present disclosure, the control system according to the fourth aspect is configured so that the first electric component includes the transmission.

With the control system according to the fifth aspect, the transmission is controlled in accordance with a change in the condition of the second human-powered vehicle. This improves the riding comfort of the first human-powered vehicle.

In accordance with a sixth aspect of the present disclosure, the control device according to the fifth aspect is configured so that the first reference information includes traveling information related to a traveling state of the second human-powered vehicle.

With the control device according to the sixth aspect, the traveling information of the second human-powered vehicle is included in the first reference information. Thus, the transmission is appropriately controlled based on the first reference information. This improves the riding comfort of the first human-powered vehicle.

In accordance with a seventh aspect of the present disclosure, the control device according to the sixth aspect is configured so that the traveling information includes at least one of drive information and behavior information. The drive information includes at least one of cadence, torque acting on a crank of the second human-powered vehicle, vehicle speed, traveling acceleration, and power. The behavior information includes at least one of vertical acceleration of the second human-powered vehicle, yaw of the second human-powered vehicle, roll of the second human-powered vehicle, and pitch of the second human-powered vehicle.

The control device according to the seventh aspect improves the riding comfort of the first human-powered vehicle.

In accordance with an eighth aspect of the present disclosure, in the control device according to the seventh aspect, the electronic controller is configured to control the transmission so that a transmission ratio of the first human-powered vehicle increases as a value related to the drive information increases.

With the control device according to the eighth aspect, the transmission is promptly controlled so that the transmission ratio of the first human-powered vehicle is set to a transmission ratio corresponding to the drive information of the second human-powered vehicle. This improves the riding comfort of the first human-powered vehicle.

In accordance with a ninth aspect of the present disclosure, in the control device according to the seventh or eighth aspect, the electronic controller is configured to control the transmission so that a transmission ratio of the first human-powered vehicle decreases as a value related to the drive information decreases.

With the control device according to the ninth aspect, the transmission is promptly controlled so that the transmission ratio of the first human-powered vehicle is set to a transmission ratio corresponding to the drive information of the second human-powered vehicle. This improves the riding comfort of the first human-powered vehicle.

In accordance with a tenth aspect of the present disclosure, the control device according to any one of the fifth to ninth aspects is configured so that the first reference information includes environment information related to a traveling environment of the second human-powered vehicle.

With the control device according to the tenth aspect, the environment information of the second human-powered vehicle is included in the first reference information. Thus, the transmission is appropriately controlled based on the first reference information. This improves the riding comfort of the first human-powered vehicle.

In accordance with an eleventh aspect of the present disclosure, the control device according to the tenth aspect is configured so that the environment information includes at least one of road surface information related to a condition of a road surface, resistance information related to a traveling resistance of the second human-powered vehicle, weather information related to weather, and temperature information related to temperature.

The control device according to the eleventh aspect improves the riding comfort of the first human-powered vehicle.

In accordance with a twelfth aspect of the present disclosure, the control device according to the eleventh aspect is configured so that the road surface information includes at least one of gradient information related to gradient of a road surface and unevenness information related to unevenness of a road surface.

The control device according to the twelfth aspect improves the riding comfort of the first human-powered vehicle.

In accordance with a thirteenth aspect of the present disclosure, in the control device according to the twelfth aspect, the electronic controller is configured to control the transmission so that a transmission ratio of the first human-powered vehicle decreases in a case where the second human-powered vehicle travels uphill.

With the control device according to the thirteenth aspect, the transmission is promptly controlled so that the transmission ratio of the first human-powered vehicle is set to a transmission ratio corresponding to an uphill. This improves the riding comfort of the first human-powered vehicle.

In accordance with a fourteenth aspect of the present disclosure, in the control device according to the twelfth or thirteenth aspect, the electronic controller is configured to control the transmission so that a transmission ratio of the first human-powered vehicle increases in a case where the second human-powered vehicle travels downhill.

With the control device according to the fourteenth aspect, the transmission is promptly controlled so that the transmission ratio of the first human-powered vehicle is set to a transmission ratio corresponding to a downhill. This improves the riding comfort of the first human-powered vehicle.

In accordance with a fifteenth aspect of the present disclosure, in the control device according to any one of the twelfth to fourteenth aspects, the electronic controller is configured to control the transmission so that a transmission ratio of the first human-powered vehicle decreases in a case where the second human-powered vehicle travels along an uneven road surface.

With the control device according to the fifteenth aspect, the transmission is promptly controlled in accordance with the unevenness of the road surface on which the second human-powered vehicle travels. This reduces the impact that is generated in a case where the first human-powered vehicle travels on the unevenness. This improves the riding comfort of the first human-powered vehicle.

In accordance with a sixteenth aspect of the present disclosure, the control device according to any one of the fifth to fifteenth aspects is configured so that the first reference information includes handling information related to operation of a handlebar of the second human-powered vehicle.

With the control device according to the sixteenth aspect, the handling information of the second human-powered vehicle is included in the first reference information. Thus, the transmission is appropriately controlled based on the first reference information. This improves the riding comfort of the first human-powered vehicle.

In accordance with a seventeenth aspect of the present disclosure, in the control device according to the sixteenth aspect, the electronic controller is configured to control the transmission so that a transmission ratio of the first human-powered vehicle decreases in a case where an operation amount of the handlebar of the second human-powered vehicle is larger than or equal to a predetermined operation amount.

With the control device according to the seventeenth aspect, the transmission is promptly controlled so that the transmission ratio of the first human-powered vehicle is set to a transmission ratio corresponding to the operation amount of the handlebar of the second human-powered vehicle. This improves the riding comfort of the first human-powered vehicle.

In accordance with an eighteenth aspect of the present disclosure, the control device according to any one of the third to seventeenth aspects is configured so that the first reference information includes action information related to an action of a second electric component of the second human-powered vehicle.

With the control device according to the eighteenth aspect, the action information of the second electric component is included in the first reference information. Thus, the first electric component is appropriately controlled based on the first reference information. This improves the riding comfort of the first human-powered vehicle.

In accordance with a nineteenth aspect of the present disclosure, in the control device according to the eighteenth aspect, the electronic controller is configured to control the first electric component based on the action information so that the first electric component acts in the same manner as the second electric component.

With the control device according to the nineteenth aspect, the first electric component is appropriately controlled in accordance with the action information. This improves the riding comfort of the first human-powered vehicle.

In accordance with a twentieth aspect of the present disclosure, in the control device according to the nineteenth aspect, the electronic controller is configured to control the first electric component in accordance with a timing at which the second electric component acts in a case where an inter-vehicle distance between the first human-powered vehicle and the second human-powered vehicle is shorter than a predetermined distance.

With the control device according to the twentieth aspect, the first electric component is controlled at an appropriate timing. Thus, a constant inter-vehicle distance is maintained. This improves the riding comfort of the first human-powered vehicle.

In accordance with a twenty-first aspect of the present disclosure, in the control device according to any one of the third to twentieth aspects, the electronic controller is configured to control the first electric component based on the first reference information and second reference information. The second reference information includes at least one of inter-vehicle information related to an inter-vehicle distance between the first human-powered vehicle and the second human-powered vehicle and history information related to a traveling history of the second human-powered vehicle.

With the control device according to the twenty-first aspect, the first electric component is controlled based on the first reference information and the second reference information. Thus, control is performed in accordance with a change in the condition of the second human-powered vehicle at an appropriate timing. This improves the riding comfort of the first human-powered vehicle.

In accordance with a twenty-second aspect of the present disclosure, in the control device according to the twenty-first aspect, the electronic controller is configured to control the first electric component based on the first reference information at a timing corresponding to the second reference information.

With the control device according to the twenty-second aspect, the first electric component is controlled at an appropriate timing. This improves the riding comfort of the first human-powered vehicle.

In accordance with a twenty-third aspect of the present disclosure, in the control device according to the twenty-second aspect, the electronic controller is configured to set a timing corresponding to the first reference information based on the second reference information and control the first electric component at the timing based on the first reference information.

With the control device according to the twenty-third aspect, the first electric component is controlled at an appropriate timing. This improves the riding comfort of the first human-powered vehicle.

A control system according to a twenty-fourth aspect of the present disclosure comprises the control device according to any one of the first to twenty-third aspects and a receiver configured to receive the first reference information.

With the control system according to the twenty-fourth aspect, the first electric component is controlled based on the first reference information received from a vehicle. Thus, control is performed in accordance with a change in the condition of the vehicle. This improves the riding comfort of the first human-powered vehicle.

The control device and the control system according to the present disclosure improve riding comfort of a human-powered vehicle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
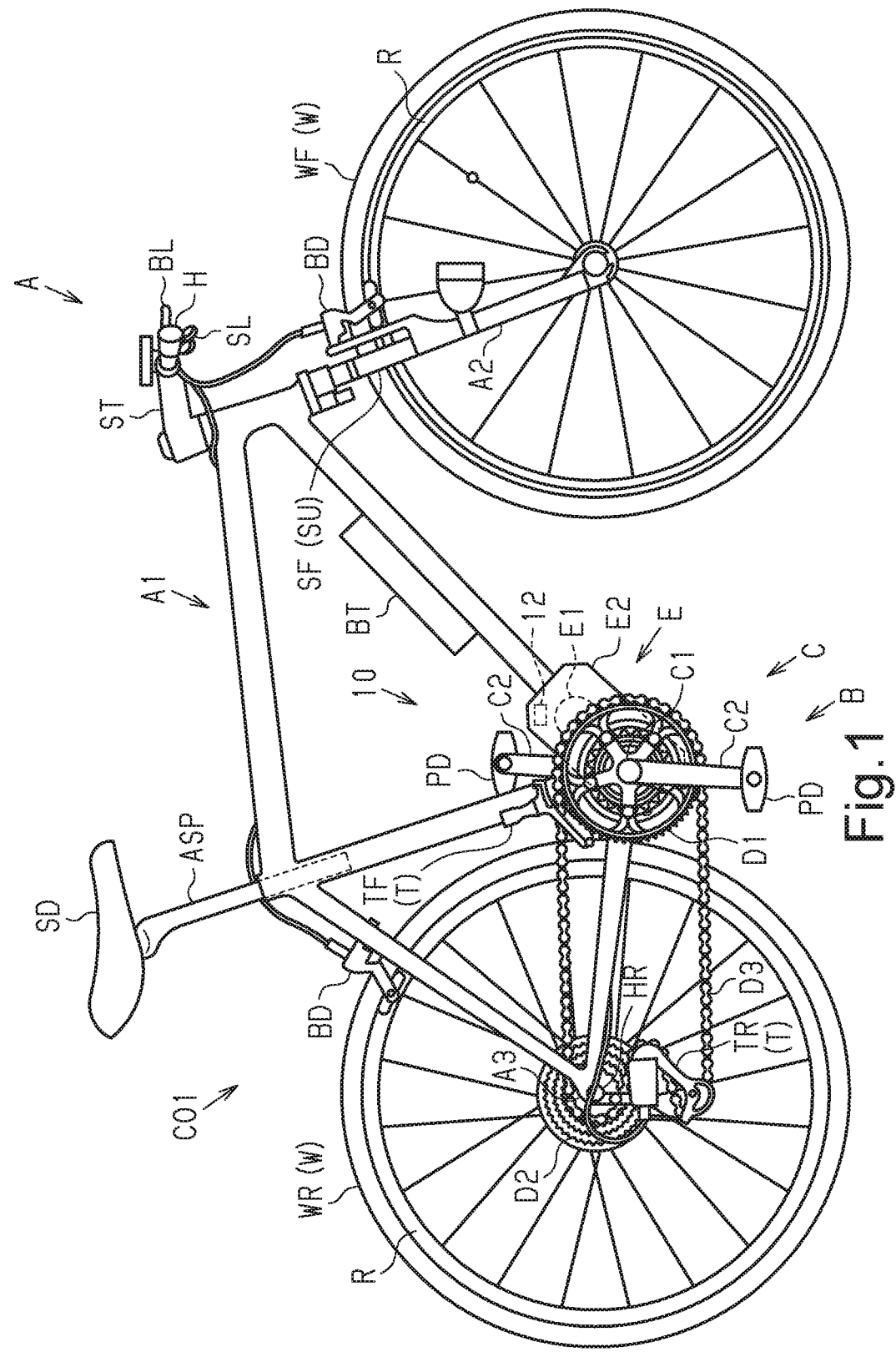
FIG. 1 is a side elevational view of a first human-powered vehicle a control system having an electronic controller in accordance with a first embodiment.

A first human-powered vehicle A that includes a control system 10 will now be described with reference to FIG. 1. The human-powered vehicle refers to a vehicle at least partially using human power as driving force for traveling and includes a vehicle electrically assisting human power. The human-powered vehicle does not include vehicles using only driving force that is not human power. In particular, a vehicle using only an internal combustion engine as driving force is not included in the human-powered vehicle. The human-powered vehicle is generally assumed to be a small, light vehicle that does not require a license for driving on a public road. The illustrated first human-powered vehicle A is a bicycle including an electric assist unit E assisting in propulsion of the first human-powered vehicle A with electrical energy. More specifically, the illustrated first human-powered vehicle A is a trekking bike. The first human-powered vehicle A further includes a frame A1, a front fork A2, wheels W, a handlebar H, and a drivetrain B. The wheels W include a front wheel WF and a rear wheel WR. The handlebar H is provided on the frame A1, for example, via a stem ST.

The drivetrain B is, for example, a chain-drive type. The drivetrain B includes a crank C, front sprockets D1, rear sprockets D2, and a chain D3. The crank C includes a crankshaft C1 rotatably supported by the frame A1 and a pair of crank arms C2 respectively provided on opposite ends of the crankshaft C1. A pedal PD is rotatably coupled to the distal end of each of the crank arms C2. The drivetrain B can be selected from any type and can be a belt-drive type or a shaft-drive type.

The front sprockets D1 are provided on the crank C to rotate integrally with the crankshaft C1. The rear sprockets D2 are provided on a hub HR of the rear wheel WR. The chain D3 runs around the front sprockets D1 and the rear sprockets D2. Human driving force applied to the pedals PD by the rider of the first human-powered vehicle A is transmitted via the front sprockets D1, the chain D3, and the rear sprockets D2 to the rear wheel WR.

The first human-powered vehicle A further includes a first electric component CO1. The first electric component CO1 includes an operated device that is electrically actuated in accordance with an input to an operating device mounted on the first human-powered vehicle A. In one example, the first electric component CO1 is actuated by, for example, electric power supplied from a battery BT mounted on the first human-powered vehicle A or electric power supplied from a dedicated power supply mounted on each first electric component CO1. The first electric component CO1 includes at least one of a transmission T, a suspension SU, an adjustable seatpost ASP, an electric assist unit E, and a brake device BD. In the present embodiment, the first electric component CO1 includes the transmission T. An operated device that is not included in the first electric component CO1 can be configured to be mechanically actuated in accordance with an input to an operating device.

The transmission T includes an external shifting device. In one example, the transmission T includes at least one of a front derailleur TF and a rear derailleur TR. The front derailleur TF is provided in the vicinity of the front sprockets D1. As the front derailleur TF is driven, the front sprocket D1 on which the chain D3 runs is changed to change the transmission ratio of the first human-powered vehicle A. The transmission ratio of the first human-powered vehicle A is specified based on the relationship between number of teeth of the front sprockets D1 and the number of teeth of the rear sprockets D2. In one example, the transmission ratio of the first human-powered vehicle A is defined by the ratio of rotational speed of the rear sprockets D2 to rotational speed of the front sprockets D1. More specifically, the transmission ratio of the first human-powered vehicle A is defined by the ratio of the number of teeth of the front sprockets D1 to the number of teeth of the rear sprockets D2. The rear derailleur TR is provided on a rear end A3 of the frame A1. As the rear derailleur TR is driven, the rear sprocket D2 on which the chain D3 runs is changed to change the transmission ratio of the first human-powered vehicle A. In one example, the transmissions T are mechanically or electrically driven in accordance with operation of respective shift operating devices SL. The transmission T can include an internal shifting device or a stepless shifting device instead of the external shifting device.

The suspension SU includes at least one of a front suspension SF and a rear suspension. The front suspension SF acts to reduce an impact that the front wheel WF receives from the ground. The rear suspension acts to reduce an impact that the rear wheel WR receives from the ground. In one example, the suspensions SU are mechanically or electrically driven in accordance with respective suspension operating devices. More specifically, at least one of the movement state, travel amount, damping force, and repulsive force of each suspension SU is changed in accordance with operation of the corresponding one of the suspension operating devices.

The adjustable seatpost APS acts so that the height of a saddle SD changes with respect to the frame A1. In one example, the adjustable seatpost ASP is mechanically or electrically driven in accordance with operation of an adjustable seatpost operating device.

The electric assist unit E acts to assist a propulsion force of the first human-powered vehicle A. The electric assist unit E acts, for example, in accordance with human driving force applied to the pedals PD. The electric assist unit E includes, for example, an electric motor E1. In one example, the electric assist unit E is electrically driven in accordance with operation of an electric assist operating device.

The brake device BD includes brake devices BD, the number of which corresponds to the number of the wheels W. In the present embodiment, the first human-powered vehicle A includes a brake device BD corresponding to the front wheel WF and a brake device BD corresponding to the rear wheel WR. The two brake devices BD have the same configuration. Each brake device BD is, for example, a rim brake device that brakes a rim R of the first human-powered vehicle A. In one example, the brake devices BD are mechanically or electrically driven in accordance with operation of respective brake operating devices BL. The brake devices BD can be disc brake devices that brake disc brake rotors mounted on the first human-powered vehicle A.

Figure 2:
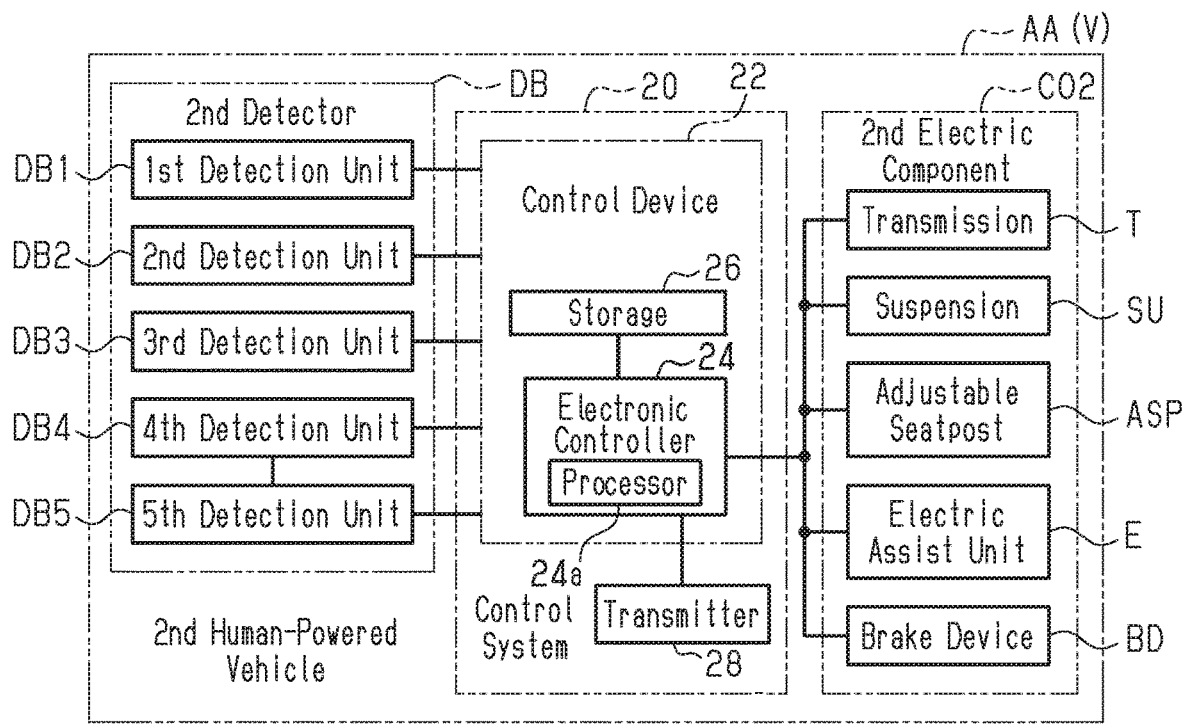
FIG. 2 is a block diagram showing the relationship between the first human-powered vehicle and a second human-powered vehicle.
Figure 2:
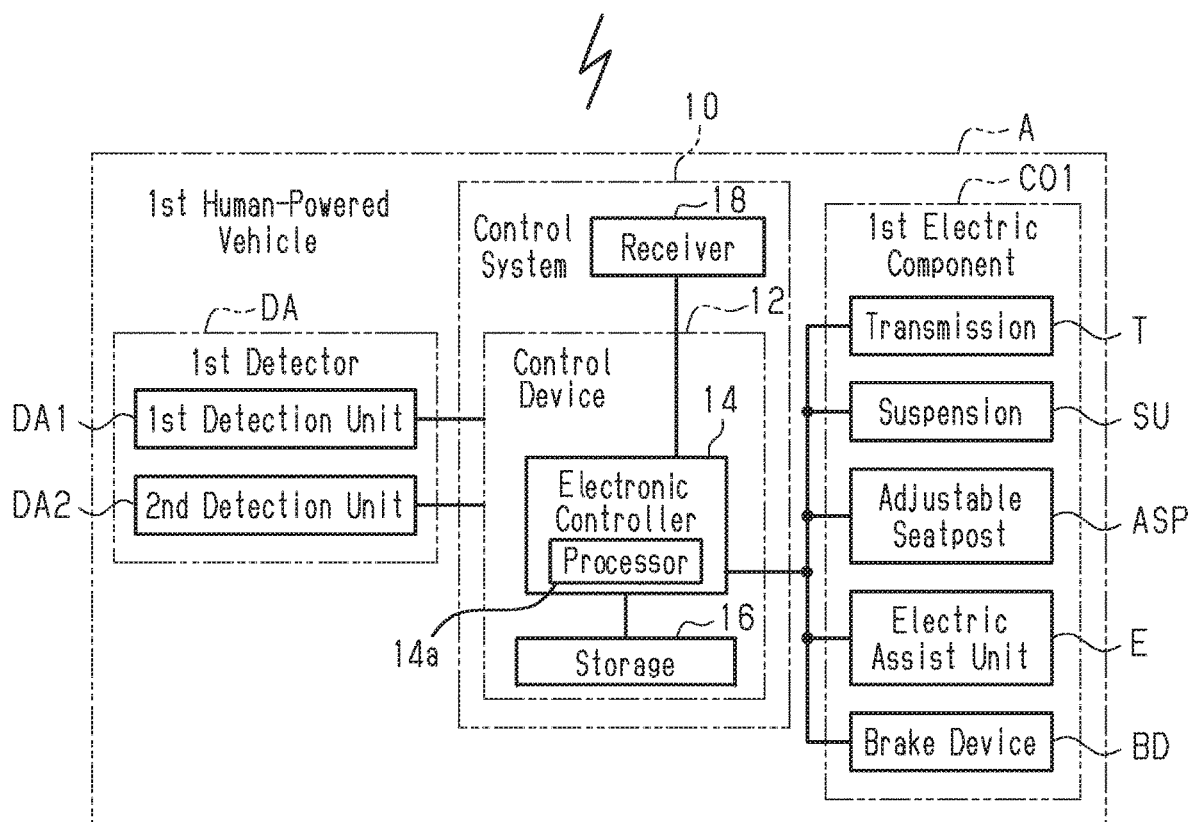

The configuration of the control system 10 will now be described with reference to FIG. 2. The control system 10 includes a control device 12 and a receiver 18 that receives first reference information IR1. The control device 12 is accommodated, for example, in a housing E2 of the electric assist unit E. The control device 12 is actuated by electric power supplied from the battery BT. The receiver 18 is provided on an outer surface of the first human-powered vehicle A. The receiver 18 receives the first reference information IR1 from a vehicle V that differs from the first human-powered vehicle A. The first reference information IR1 includes information related to the vehicle V, which differs from the first human-powered vehicle A. The receiver 18 is a wireless communication device. The term "wireless communication device" as used herein includes a receiver, a transmitter, a transceiver, a transmitter-receiver, and contemplates any device or devices, separate or combined, capable of transmitting and/or receiving wireless communication signals, including signals or commands related to some function of the component being controlled. The wireless communication signals can be radio frequency (RF) signals, ultra-wide band communication signals, or Bluetooth® communications or any other type of signal suitable for short range wireless communications as understood in the bicycle field. Here, the receiver 18 is one-way wireless communication device. More preferably, the receiver 18 is replaced with a transceiver so that the first human-powered vehicle A can transmit information to the vehicle V as well as receive information from the vehicle V.

The control device 12 includes an electronic controller 14 that controls the first electric component CO1 of the first human-powered vehicle A. The electronic controller 14 is formed of one or more semiconductor chips that are mounted on a circuit board. The term "electronic controller" as used herein refers to hardware that executes a software program, and does not include a human. The electronic controller 14 is a central processing unit (CPU) or a micro processing unit (MPU) that includes at least one processor 14a. The electronic controller 14, for example, obtains the first reference information IR1 from the receiver 18. The control device 12 further includes storage 16 that stores various kinds of information. The storage 16 is any computer storage device or any non-transitory computer-readable medium with the sole exception of a transitory, propagating signal. For example, the storage 16 includes a nonvolatile memory and a volatile memory. The storage 16 stores, for example, various programs for control and predetermined information. The electronic controller 14 can be one or more integrated circuits having firmware for causing the circuitry to complete the activities described herein. Of course, any number of other analog and/or digital components capable of performing the below described functionality can be provided in place of, or in conjunction with the described controller elements.

The electronic controller 14 controls the first electric component CO1 based on the first reference information IR1 related to the vehicle V, which differs from the first human-powered vehicle A. The vehicle V is a vehicle traveling ahead of the first human-powered vehicle A. In the present embodiment, the vehicle V includes a second human-powered vehicle AA (refer to FIG. 3). The electronic controller 14 can control an operated device in accordance with operation input to an operating device mounted on the first human-powered vehicle A.

The second human-powered vehicle AA is, for example, a vehicle preceding the first human-powered vehicle A. The configuration of the second human-powered vehicle AA can be substantially the same as the configuration of the first human-powered vehicle A configuration or can partially differ from the configuration of the first human-powered vehicle A. The same reference characters are given to those components of the second human-powered vehicle AA that are the same as the corresponding components of the first human-powered vehicle A. Such components will not be described in detail. In the present embodiment, the second human-powered vehicle AA and the first human-powered vehicle A have substantially the same configuration except for the control system 10. The second human-powered vehicle AA includes a control system 20 that differs from the control system 10.

The control system 20 includes a control device 22 and a transmitter 28 that transmits the first reference information IR1. The control device 22 includes an electronic controller 24 that controls a second electric component CO2 of the second human-powered vehicle AA and storage 26 that stores various kinds of information. The electronic controller 24 is a CPU or an MPU. The electronic controller 24 controls the second electric component CO2, for example, in accordance with an input to an operating device mounted on the second human-powered vehicle AA. The second electric component CO2 includes an operated device that is electrically actuated in accordance with an input to the operating device. The second electric component CO2 includes at least one of a transmission T, a suspension SU, an adjustable seatpost ASP, an electric assist unit E, and a brake device BD. The second electric component CO2 can include an operated device that is mechanically actuated in accordance with an input to the operating device instead of or in addition to the operated device electrically actuated in accordance with an input to the operating device. The storage 26 includes a nonvolatile memory and a volatile memory. The storage 26 stores, for example, various programs for control and predetermined information. The transmitter 28 is provided on an outer surface of the second human-powered vehicle AA. The transmitter 28 is a wireless communication device. Here, the transmitter 28 is one-way wireless communication device. More preferably, the transmitter 28 is replaced with a transceiver so that the second human-powered vehicle AA can receive information from the first human-powered vehicle A as well as transmit information to the first human-powered vehicle A. In one example, the electronic controller 24 causes the transmitter 28 to transmit the first reference information IR1 obtained from a second detector DB, which will be described later. The receiver 18 of the first human-powered vehicle A can directly receive various kinds of information transmitted from the transmitter 28 or receive through the Internet or the like.

The control device 12 of the first human-powered vehicle A is paired in advance with the control device 22 of the second human-powered vehicle AA so that the first reference information IR1 is received from the second human-powered vehicle AA. In the present embodiment, the electronic controller 14 receives the first reference information IR1 via the transmitter 28 and the receiver 18 and controls the first electric component CO1 based on the first reference information IR1.

The first reference information IR1 includes traveling information related to a traveling state of the second human-powered vehicle AA. The traveling information includes at least one of drive information and behavior information. The drive information includes at least one of cadence, torque acting on the crank C of the second human-powered vehicle AA, vehicle speed, traveling acceleration, and power. The behavior information includes at least one of vertical acceleration of the second human-powered vehicle AA, yaw of the second human-powered vehicle AA, roll of the second human-powered vehicle AA, and pitch of the second human-powered vehicle AA.

Cadence is equivalent to the number of rotations of the crank C per unit time. The traveling acceleration is acceleration in the front-rear direction of the second human-powered vehicle AA. Power is the product of cadence and torque. The vertical acceleration is acceleration in the vertical direction of the second human-powered vehicle AA. In other words, the vertical acceleration is acceleration in the perpendicular direction of the second human-powered vehicle AA. In one example, the vertical acceleration indicates acceleration of the second human-powered vehicle AA in a case where the second human-powered vehicle travels along, for example, an uneven road surface and the second human-powered vehicle AA falls from the unevenness. Yaw of the second human-powered vehicle AA specifies rotation of the second human-powered vehicle AA about a vertical axis. In one example, yaw of the second human-powered vehicle AA includes at least one of an angle and an angular speed of rotation of the second human-powered vehicle AA about the vertical axis. Roll of the second human-powered vehicle AA specifies a sideward inclination of the second human-powered vehicle AA from a vertical plane. In one example, roll of the second human-powered vehicle AA includes at least one of an angle and an angular speed of the sideward inclination of the second human-powered vehicle AA from the vertical plane. Pitch of the second human-powered vehicle AA specifies a front-rear inclination of the second human-powered vehicle AA from a horizontal plane. In one example, pitch of the second human-powered vehicle AA includes at least one of an angle and an angular speed of the front-rear inclination of the second human-powered vehicle AA from the horizontal plane. Pitch of the second human-powered vehicle AA increases, for example, as the position of the front wheel WF becomes higher than the position of the rear wheel WR. Pitch of the second human-powered vehicle AA decreases as the position of the front wheel WF becomes lower than the position of the rear wheel WR.

The first reference information IR1 includes environment information related to a traveling environment of the second human-powered vehicle AA. The environment information includes at least one of road surface information related to a condition of a road surface, resistance information related to a traveling resistance of the second human-powered vehicle AA, weather information related to weather, and temperature information related to temperature. The road surface information includes at least one of gradient information related to gradient of a road surface and unevenness information related to unevenness of a road surface. The gradient information correlates with pitch of the second human-powered vehicle AA. The unevenness information correlates with vertical acceleration of the second human-powered vehicle AA. The traveling resistance of the second human-powered vehicle AA is calculated, for example, based on cadence, torque, vehicle speed, and the transmission efficiency of the drive system of the second human-powered vehicle AA.

The first reference information IR1 includes handling information related to operation of the handlebar H of the second human-powered vehicle AA. The handling information includes information related to an operation amount of the handlebar H. The operation amount of the handlebar H includes at least one of a steering angle of the handlebar H and a steering angular speed of the handlebar H.

The first reference information IR1 includes action information related to an action of the second electric component CO2 of the second human-powered vehicle AA. Specifically, the action information includes at least one of information related to a shifting action of the transmission T, information related to an action of the suspension SU, information related to an action of the adjustable seatpost ASP, information related to an action of the electric assist unit E, and information related to an action of the brake device BD. The shifting action of the transmission T includes at least one of a shift-up transmission, which increases the transmission ratio of the second human-powered vehicle AA, and a shift-down transmission, which decreases the transmission ratio of the second human-powered vehicle AA. The action of the suspension SU includes an action that changes at least one of a movement state, a travel amount, damping force, and repulsion force. The action of the adjustable seatpost ASP includes an action that changes the height of the saddle SD with respect to the frame A1. The action of the electric assist unit E includes an action that changes assisting force of the second human-powered vehicle AA. The assisting force is output of the electric motor E1 of the electric assist unit E. The action of the brake device BD includes an action that changes braking force applied to the wheel W.

In the present embodiment, the first reference information IR1 includes at least one of the traveling information, the environment information, the handling information, and the action information. In other words, the electronic controller 14 controls the first electric component CO1 based on the first reference information IR1 that includes at least one of the traveling information, the environment information, the handling information, and the action information. In one example, the electronic controller 14 controls the transmission T in accordance with at least one of first to third examples described below.

In the first example, in a case where a first predetermined condition related to the first reference information IR1 is satisfied, the electronic controller 14 controls the transmission T so that the transmission ratio of the first human-powered vehicle A increases. For example, in a case where at least one of first to seventh conditions is satisfied, the electronic controller 14 determines that the first predetermined condition is satisfied. In a case where the first predetermined condition is satisfied and the transmission ratio of the first human-powered vehicle A is the maximum transmission ratio, the electronic controller 14 does not control the transmission T so that the transmission ratio of the first human-powered vehicle A is maintained. The maximum transmission ratio is the maximum transmission ratio determined based on the relationship between the front sprockets D1 and the rear sprockets D2. In a case where the first predetermined condition is satisfied and then the first predetermined condition becomes unsatisfied, the electronic controller 14 can control the transmission T so that the transmission ratio of the first human-powered vehicle A is restored.

In a case where a value related to the drive information is increased, the electronic controller 14 controls the transmission T so that the transmission ratio of the first human-powered vehicle A increases. In one example, in a case where the value related to the drive information is increased, the electronic controller 14 determines that at least one of the first to fourth conditions is satisfied. In a case where cadence is greater than or equal to first cadence, the electronic controller 14 determines that the first condition is satisfied. In a case where the vehicle speed is greater than or equal to a first vehicle speed, the electronic controller 14 determines that the second condition is satisfied. In a case where the traveling acceleration is greater than or equal to a first traveling acceleration, the electronic controller 14 determines that the third condition is satisfied. In a case where power is greater than or equal to first power, the electronic controller 14 determines that the fourth condition is satisfied. The drive information that is used for determination of whether the first to fourth conditions are satisfied does not include torque acting on the crank C of the second human-powered vehicle AA.

In a case where the second human-powered vehicle AA travels downhill, the electronic controller 14 controls the transmission T so that the transmission ratio of the first human-powered vehicle A increases. In one example, in a case where it is determined that the second human-powered vehicle AA travels downhill, the electronic controller 14 determines that at least one of the fifth to seventh conditions is satisfied. In a case where torque is less than a first torque, the electronic controller 14 determines that the fifth condition is satisfied. In a case where pitch of the second human-powered vehicle AA is less than a first pitch, the electronic controller 14 determines that the sixth condition is satisfied. In a case where the gradient of the road surface is less than a first gradient, the electronic controller 14 determines that the seventh condition is satisfied.

In the second example, in a case where a second predetermined condition related to the first reference information IR1 is satisfied, the electronic controller 14 controls the transmission T so that the transmission ratio of the first human-powered vehicle A decreases. For example, in a case where at least one of eighth to twenty-second conditions is satisfied, the electronic controller 14 determines that the second predetermined condition is satisfied. In a case where the second predetermined condition is satisfied and the transmission ratio of the first human-powered vehicle A is the minimum transmission ratio, the electronic controller 14 does not control the transmission T so that the transmission ratio of the first human-powered vehicle A is maintained. The minimum transmission ratio is the minimum transmission ratio determined based on the relationship between the front sprockets D1 and the rear sprockets D2. In a case where the second predetermined condition is satisfied and then the second predetermined condition becomes unsatisfied, the electronic controller 14 can control the transmission T so that the transmission ratio of the first human-powered vehicle A is restored.

In a case where a value related to the drive information is decreased, the electronic controller 14 controls the transmission T so that the transmission ratio of the first human-powered vehicle A decreases. In one example, in a case where the value related to the drive information is decreased, the electronic controller 14 determines that at least one of the eighth to eleventh conditions is satisfied. In a case where cadence is less than second cadence, the electronic controller 14 determines that the eighth condition is satisfied. The second cadence can be equal to the first cadence or can differ from the first cadence. In a case where the first cadence differs from the second cadence, the second cadence is less than the first cadence. In a case where the vehicle speed is less than a second vehicle speed, the electronic controller 14 determines that the ninth condition is satisfied. The second vehicle speed can be equal to the first vehicle speed or can differ from the first vehicle speed. In a case where the first vehicle speed differs from the second vehicle speed, the second vehicle speed is less than the first vehicle speed. In a case where the traveling acceleration is less than a second traveling acceleration, the electronic controller 14 determines that the tenth condition is satisfied. The second traveling acceleration can be equal to the first traveling acceleration or can differ from the first traveling acceleration. In a case where the first traveling acceleration differs from the second traveling acceleration, the second traveling acceleration is less than the first traveling acceleration. In a case where power is less than second power, the electronic controller 14 determines that the eleventh condition is satisfied. The second power can be equal to the first power or can differ from the first power. In a case where the first power differs from the second power, the second power is less than the first power. The drive information that is used for determination of whether the eighth to eleventh conditions are satisfied does not include torque acting on the crank C of the second human-powered vehicle AA.

In a case where the second human-powered vehicle AA travels uphill, the electronic controller 14 controls the transmission T so that the transmission ratio of the first human-powered vehicle A decreases. In one example, in a case where it is determined that the second human-powered vehicle AA travels uphill, the electronic controller 14 determines that at least one of the twelfth to fourteenth conditions is satisfied. In a case where torque is greater than or equal to a second torque, the electronic controller 14 determines that the twelfth condition is satisfied. The second torque can be equal to the first torque or can differ from the first torque. In a case where the first torque differs from the second torque, the second torque is greater than the first torque. In a case where pitch of the second human-powered vehicle AA is greater than or equal to a second pitch, the electronic controller 14 determines that the thirteenth condition is satisfied. The second pitch can be equal to the first pitch or can differ from the first pitch. In a case where the first pitch differs from the second pitch, the second pitch is greater than the first pitch. In a case where the gradient of a road surface is greater than or equal to a second gradient, the electronic controller 14 determines that the fourteenth condition is satisfied. The second gradient can be equal to the first gradient or can differ from the first gradient. In a case where the first gradient differs from the second gradient, the second gradient is greater than the first gradient.

In a case where the second human-powered vehicle AA travels along an uneven road surface, the electronic controller 14 controls the transmission T so that the transmission ratio of the first human-powered vehicle A decreases. In one example, in a case where it is determined that the second human-powered vehicle AA travels along an uneven road surface, the electronic controller 14 determines that at least one of the fifteenth and sixteenth conditions is satisfied. In a case where the vertical acceleration of the second human-powered vehicle AA is greater than or equal to a predetermined vertical acceleration, the electronic controller 14 determines that the fifteenth condition is satisfied. In a case where the unevenness of the road surface is greater than or equal to a predetermined unevenness, the electronic controller 14 determines that the sixteenth condition is satisfied.

In a case where the second human-powered vehicle AA travels along a corner, the electronic controller 14 controls the transmission T so that the transmission ratio of the first human-powered vehicle A decreases. In one example, in a case where it is determined that the second human-powered vehicle AA travels along a corner, the electronic controller 14 determines that at least one of the seventeenth to nineteenth conditions is satisfied. In a case where yaw of the second human-powered vehicle AA is greater than or equal to a predetermined yaw, the electronic controller 14 determines that the seventeenth condition is satisfied. In a case where roll of the second human-powered vehicle AA is greater than or equal to a predetermined roll, the electronic controller 14 determines that the eighteenth condition is satisfied. In a case where the operation amount of the handlebar H of the second human-powered vehicle AA is greater than or equal to a predetermined operation amount, the electronic controller 14 determines that the nineteenth condition is satisfied. In other words, in a case where the operation amount of the handlebar H of the second human-powered vehicle AA is greater than or equal to the predetermined operation amount, the electronic controller 14 controls the transmission T so that the transmission ratio of the first human-powered vehicle A decreases.

In a case where it is determined that the driving performance of the riders of the human-powered vehicles A and AA is decreased, the electronic controller 14 controls the transmission T so that the transmission ratio of the first human-powered vehicle A decreases. In one example, in a case where it is determined that the driving performance of the riders of the human-powered vehicles A and AA is decreased, the electronic controller 14 determines that at least one of the twentieth to twenty-second conditions is satisfied. In a case where the traveling resistance of the second human-powered vehicle AA is greater than or equal to a predetermined traveling resistance, the electronic controller 14 determines that the twentieth condition is satisfied. In a case where the weather is predetermined weather, the electronic controller 14 determines that the twenty-first condition is satisfied. An example of the predetermined weather is rainy weather. In a case where the temperature is greater than or equal to a first predetermined temperature or less than a second predetermined temperature, the electronic controller 14 determines that the twenty-second condition is satisfied. The first temperature is greater than the second temperature. The first temperature is set based on a high temperature at which it is determined that the driving performance of the rider is decreased. The second temperature is set based on a low temperature at which it is determined that the driving performance of the rider is decreased.

In the third example, the electronic controller 14 controls the first electric component CO1 so that the first electric component CO1 acts in the same manner as the second electric component CO2 based on the action information. In one example, in a case where an inter-vehicle distance VD between the first human-powered vehicle A and the second human-powered vehicle AA is shorter than a predetermined distance, the electronic controller 14 controls the first electric component CO1 in accordance with a timing at which the second electric component CO2 acts. Specifically, in a case where the inter-vehicle distance VD is shorter than the predetermined distance, the electronic controller 14 controls the first electric component CO1 so that the difference between the timing at which the second electric component CO2 acts and the timing at which the first electric component CO1 acts is decreased. The inter-vehicle distance VD is defined, for example, by the distance between the control system 20 of the second human-powered vehicle AA and the control system 10 of the first human-powered vehicle A (refer to FIG. 3). The predetermined distance is set based on an inter-vehicle distance VD that allows the first human-powered vehicle A and the second human-powered vehicle AA to travel integrally with each other. Preferably, the predetermined distance is included, for example, in a range of 5 m or less. An example of the predetermined distance is 2 m. The inter-vehicle distance VD can be defined by the distance between the transmitter 28 of the second human-powered vehicle AA and the receiver 18 of the first human-powered vehicle A. In this case, the predetermined distance can be a distance by which the receiver 18 can directly receive various kinds of information transmitted from the transmitter 28. The inter-vehicle distance VD can be defined by the distance between the rear wheel WR of the second human-powered vehicle AA and the front wheel WF of the first human-powered vehicle A. In the present embodiment, in a case where the inter-vehicle distance VD is less than the predetermined distance, the electronic controller 14 controls the transmission T of the first electric component CO1 so that the transmission T of the first electric component CO1 acts in the same manner as the transmission T of the second electric component CO2 at the same timing as the transmission T of the second electric component CO2 acts. In a case where the amount of time the first human-powered vehicle A takes to travel on the road surface on which the second human-powered vehicle AA travelled is less than a predetermined amount of time, the electronic controller 14 can control the first electric component CO1 in accordance with the timing at which the second electric component CO2 acts. Preferably, the predetermined amount of time is included, for example, in a range of one second or less. An example of the predetermined amount of time is 0.5 seconds.

In the present embodiment, the electronic controller 14 controls the transmission T in accordance with each of the first example, the second example, and the third example that are described above. The electronic controller 14 controls the first electric component CO1 based on the first reference information IR1 and second reference information IR2. The second reference information IR2 includes at least one of inter-vehicle information related to the inter-vehicle distance VD between the first human-powered vehicle A and the second human-powered vehicle AA and history information related to a traveling history of the second human-powered vehicle AA. The traveling history of the second human-powered vehicle AA includes at least one of information related to gradient of the road surface on which the second human-powered vehicle AA has travelled and information related to the past traveling resistance of the second human-powered vehicle AA.

The electronic controller 14 controls the first electric component CO1 at the timing corresponding to the second reference information IR2 based on the first reference information IR1. In one example, the electronic controller 14 sets a timing corresponding to the first reference information IR1 based on the second reference information IR2 and controls the first electric component CO1 at the timing based on the first reference information IR1. The timing corresponding to the first reference information IR1 is specified, for example, by the time the first human-powered vehicle A takes to travel on the road surface on which the second human-powered vehicle AA traveled. The taken time is calculated, for example, based on at least one of the inter-vehicle information and the history information included in the second reference information IR2. In one example, the electronic controller 14 calculates the taken time based on the vehicle speed of the first human-powered vehicle A and the inter-vehicle distance VD. In another example, the electronic controller 14 calculates the taken time based on time that at least one of the gradient of the road surface on which the first human-powered vehicle A travelled and the traveling resistance of the first human-powered vehicle A takes to conform to the traveling history of the second human-powered vehicle AA. In the present embodiment, the electronic controller 14 sets a timing corresponding to the first reference information IR1 in accordance with the taken time calculated based on the second reference information IR2 and controls the transmission T at the timing based on the first reference information IR1. The timing corresponding to the first reference information IR1 can be set to a timing at which the first human-powered vehicle A travels on the road surface on which the second human-powered vehicle AA travelled or can be set to a timing before the first human-powered vehicle A travels.

The first human-powered vehicle A further includes a first detector DA that detects various kinds of information. The first detector DA detects various kinds of information, for example, needed for setting the timing of controlling the first electric component CO1. The first detector DA includes a first detection unit DA1 and a second detection unit DA2. The first detector DA transmits the various kinds of detected information to the electronic controller 14. Among various sensors included in the first detector DA, those sensors that are not used for controlling the first electric component CO1 can be omitted from the first human-powered vehicle A.

The first detection unit DA1 is configured to detect inter-vehicle information included in the second reference information IR2. The first detection unit DA1 includes, for example, at least one of a radar and a global positioning system (GPS). The radar transmits electromagnetic waves toward the second human-powered vehicle AA, which travels ahead of the first human-powered vehicle A, and detects the inter-vehicle distance VD based on reflected waves of the electromagnetic waves. The global positioning system detects positional information of the first human-powered vehicle A. In one example in which the global positioning system is used, the inter-vehicle distance VD is estimated based on the relationship between the positional information of the first human-powered vehicle A and positional information of the second human-powered vehicle AA. The positional information of the second human-powered vehicle AA is detected by a global positioning system mounted on the second human-powered vehicle AA. The second detection unit DA2 is configured to detect information corresponding to the traveling history of the second human-powered vehicle AA. The second detection unit DA2 includes at least one of a sensor that detects gradient of the road surface and a sensor that detects the traveling resistance of the first human-powered vehicle A.

The second human-powered vehicle AA further includes the second detector DB that detects various kinds of information. The second detector DB detects, for example, various elements included in the reference information IR1 and IR2. The second detector DB includes a first detection unit DB1, a second detection unit DB2, a third detection unit DB3, a fourth detection unit DB4, and a fifth detection unit DB5. The second detector DB transmits the various kinds of detected information to the electronic controller 24. Among various sensors included in the second detector DB, those sensors that are not used for controlling the first electric component CO1 of the first human-powered vehicle A can be omitted from the second human-powered vehicle AA.

The first detection unit DB1 is configured to detect the traveling information included in the first reference information IR1. The first detection unit DB1 includes at least one of a sensor that detects cadence, a sensor that detects torque, a sensor that detects vehicle speed, a sensor that detects traveling acceleration, a sensor that detects vertical acceleration of the second human-powered vehicle AA, a sensor that detects yaw of the second human-powered vehicle AA, a sensor that detects roll of the second human-powered vehicle AA, and a sensor that detects pitch of the second human-powered vehicle AA. The second detection unit DB2 is configured to detect the environment information included in the first reference information IR1. The second detection unit DB2 includes at least one of a sensor that detects gradient of the road surface, a sensor that detects unevenness of the road surface, a sensor that detects traveling resistance of the second human-powered vehicle AA, a receiver that receives weather information from an external device, and a sensor that detects the temperature.

The third detection unit DB3 is configured to detect the handling information included in the first reference information IR1. The third detection unit DB3 includes a sensor that detects an operation amount of the handlebar H. The fourth detection unit DB4 is configured to detect the action information included in the first reference information IR1. The fourth detection unit DB4 includes at least one of a sensor that detects a shifting action of the transmission T, a sensor that detects an action of the suspension SU, a sensor that detects an action of the adjustable seatpost ASP, a sensor that detects an action of the electric assist unit E, and a sensor that detects an action of the brake device BD. The fifth detection unit DB5 is configured to detect various elements included in the second reference information IR2. The fifth detection unit DB5 includes at least one of a sensor that detects the inter-vehicle information and a sensor that detects the traveling history of the second human-powered vehicle AA. The sensor detecting the inter-vehicle information includes the global positioning system described above. The first human-powered vehicle A can further include various sensors corresponding to the transmitter 28 and the second detector DB mounted on the second human-powered vehicle A. In this case, the first human-powered vehicle A can be used as a preceding vehicle.

Figure 3:
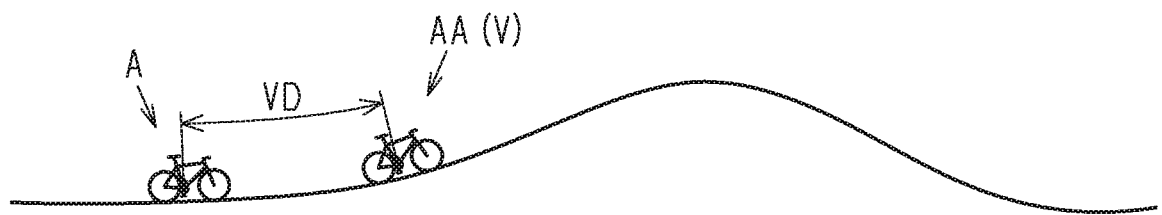
FIG. 3 is a schematic diagram showing an example of an action of the first human-powered vehicle following the second human-powered vehicle.

An example of an action of the first human-powered vehicle A will now be described with reference to FIGS. 3 to 5. As shown in FIG. 3, the rider of the first human-powered vehicle A rides the first human-powered vehicle A to follow the second human-powered vehicle AA. As the first human-powered vehicle A starts to travel, the electronic controller 14 starts to obtain the reference information IR1 and IR2 from the first detector DA and the second detector DB. In one example, the electronic controller 14 obtains various kinds of information detected by the first detector DA through an electric wire or the like and obtains information detected by the second detector DB via the transmitter 28 and the receiver 18. The electronic controller 14 sets a timing corresponding to the first reference information IR1 based on the second reference information IR2. The timing corresponding to the first reference information IR1 is updated in accordance with a change in taken time. FIG. 3 shows a state in which the second human-powered vehicle AA is about to travel uphill. In the example shown in FIG. 3, the electronic controller 14 determines that the second predetermined condition is satisfied.

Figure 4:
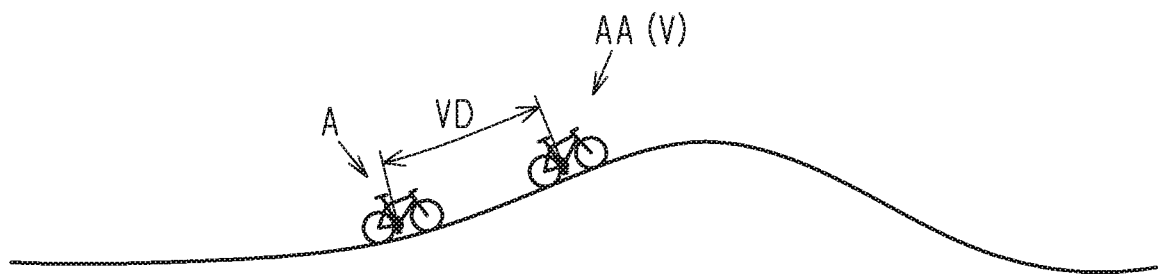
FIG. 4 is a schematic diagram showing an example of an action of the first human-powered vehicle following the second human-powered vehicle.

FIG. 4 shows a state in which the first human-powered vehicle A travels on the road surface on which the second human-powered vehicle AA shown in FIG. 3 travelled. The electronic controller 14 controls the transmission T so that the transmission ratio of the first human-powered vehicle A is decreased at the timing corresponding to the first reference information IR1. In one example, the electronic controller 14 controls the transmission T so that the transmission ratio of the first human-powered vehicle A is decreased when the first human-powered vehicle A has reached the uphill or before the first human-powered vehicle A reaches the uphill. In the example shown in FIG. 4, the gradient of the uphill on which the second human-powered vehicle AA travels is greater than the gradient of the uphill on which the first human-powered vehicle A travels.

Figure 5:
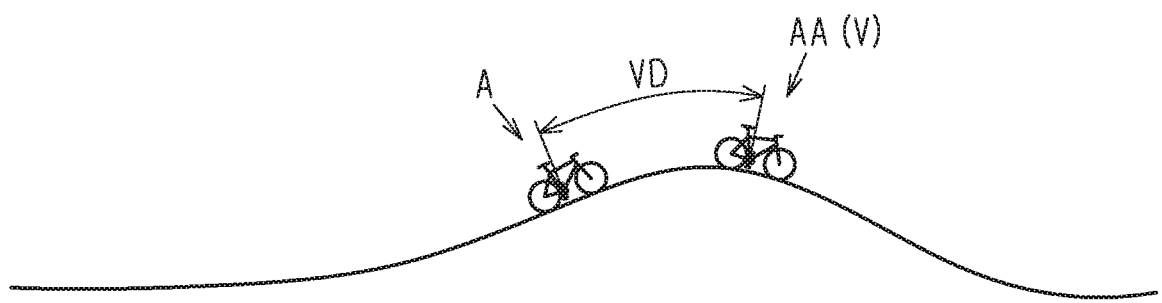
FIG. 5 is a schematic diagram showing an example of an action of the first human-powered vehicle following the second human-powered vehicle.

FIG. 5 shows a state in which the first human-powered vehicle A travels on the road surface on which the second human-powered vehicle AA shown in FIG. 4 travels. The electronic controller 14 controls the transmission T so that the transmission ratio of the first human-powered vehicle A is further decreased at the timing corresponding to the first reference information IR1. FIG. 5 shows a state in which the second human-powered vehicle AA is about to travel downhill. In the example shown in FIG. 5, the electronic controller 14 determines that the first predetermined condition is satisfied. Subsequently, the electronic controller 14 controls the transmission T so that the transmission ratio of the first human-powered vehicle A is increased at the timing corresponding to the first reference information IR1. In a case where the inter-vehicle distance VD is less than the predetermined distance, the electronic controller 14 can control the transmission T of the first human-powered vehicle A so that the transmission T of the first human-powered vehicle A acts in the same manner as the transmission T of the second human-powered vehicle AA.

Figure 6:
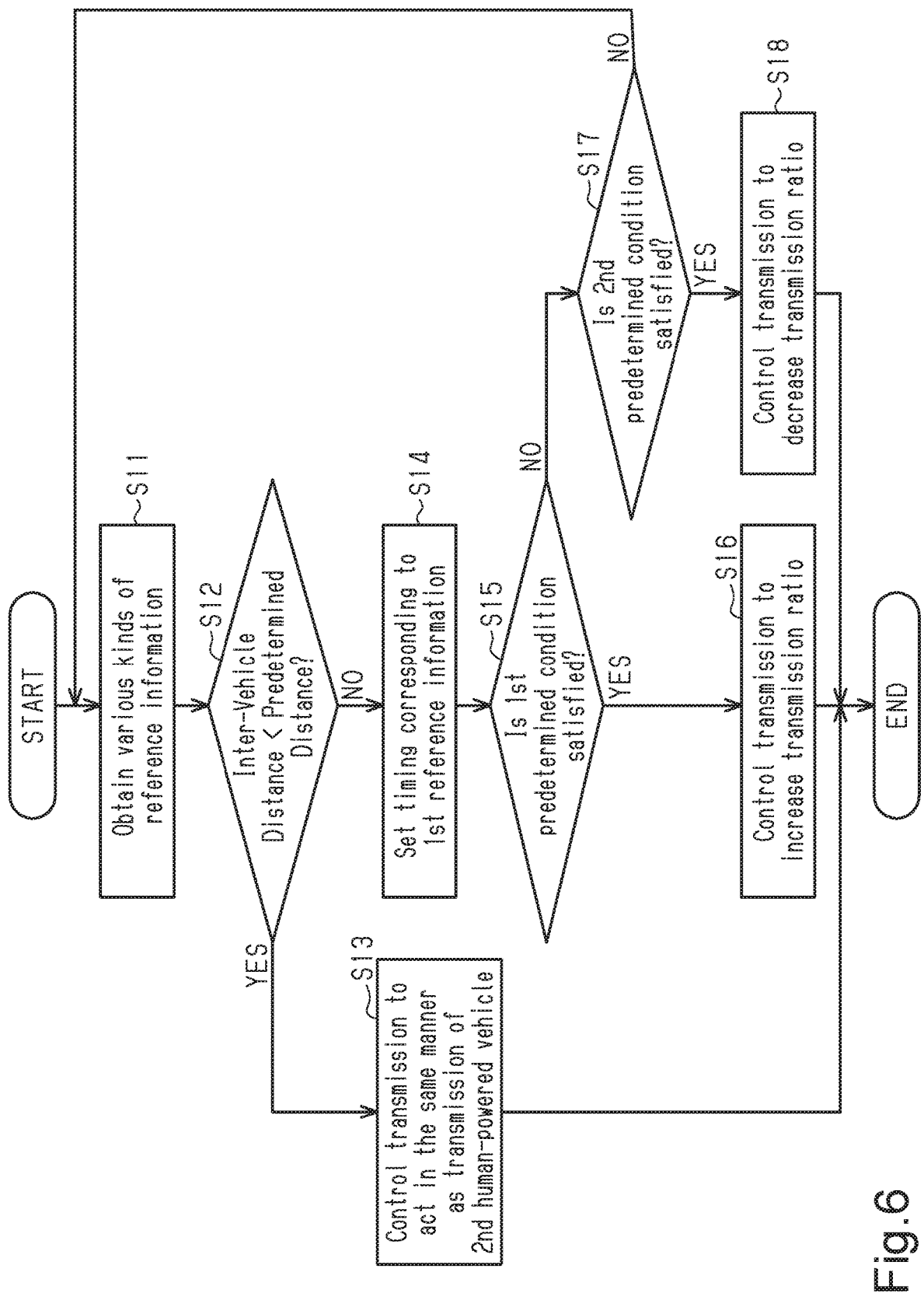
FIG. 6 is a flowchart showing an example of control executed by the electronic controller shown in FIG. 1.

An example of control executed by the control device 12 will now be described with reference to FIG. 6. The control device 12 is paired with the control device 22 of the second human-powered vehicle AA in advance. In step S11, the electronic controller 14 obtains various kinds of the reference information IR1 and IR2. Specifically, the electronic controller 14 obtains the reference information IR1 and IR2 from the first detector DA and the second detector DB. In step S12, the electronic controller 14 determines whether or not the inter-vehicle distance VD is less than the predetermined distance. In a case where it is determined in step S12 that the inter-vehicle distance VD is less than the predetermined distance, the electronic controller 14 proceeds to step S13. In step S13, the electronic controller 14 controls the transmission T of the first human-powered vehicle A so that the transmission T of the first human-powered vehicle A acts in the same manner as the transmission T of the second human-powered vehicle AA.

In a case where the inter-vehicle distance VD is greater than or equal to the predetermined distance in step S12, the electronic controller 14 proceeds to step S14. In step S14, the electronic controller 14 sets a timing corresponding to the first reference information IR1. Specifically, the electronic controller 14 calculates taken time based on the second reference information IR2 and sets a timing corresponding to the first reference information IR1 based on the taken time.

In step S15, the electronic controller 14 determines whether or not the first predetermined condition is satisfied. In a case where it is determined in step S15 that the first predetermined condition is satisfied, the electronic controller 14 proceeds to step S16. In step S16, the electronic controller 14 controls the transmission T so that the transmission ratio of the first human-powered vehicle A is increased. Specifically, the electronic controller 14 controls the transmission T so that the transmission ratio of the first human-powered vehicle A is increased at the timing set in step S14.

In a case where it is determined in step S15 that the first predetermined condition is not satisfied, the electronic controller 14 proceeds to step S17. In step S17, the electronic controller 14 determines whether or not the second predetermined condition is satisfied. In a case where it is determined in step S17 that the second predetermined condition is not satisfied, the electronic controller 14 returns to step S11. In a case where it is determined in step S17 that the second predetermined condition is satisfied, the electronic controller 14 proceeds to step S18. In step S18, the electronic controller 14 controls the transmission T so that the transmission ratio of the first human-powered vehicle A is decreased. Specifically, the electronic controller 14 controls the transmission T so that the transmission ratio of the first human-powered vehicle A is decreased at the timing set in step S14.

The above-described process completes steps S11 to S18. For example, while the first human-powered vehicle A is traveling, the electronic controller 14 repeatedly performs steps S11 to S18. In the present embodiment, while the first human-powered vehicle A is traveling, the electronic controller 14 concurrently and sequentially performs steps S11 to S18. Steps S12 and S13 can be omitted from the process from step S11 to step S18 shown in FIG. 6.

Second Embodiment

A second embodiment of the control system 10 will now be described with reference to FIG. 7. The same reference characters are given to those elements that are the same as the corresponding elements of the first embodiment. Such elements will not be described in detail.

The first electric component CO1 of the second embodiment includes the suspension SU instead of or in addition to the transmission T. The electronic controller 14 controls the suspension SU, for example, in accordance with at least one of a fourth example and a fifth example described below.

In the fourth example, in a case where a third predetermined condition related to the first reference information IR1 is satisfied, the electronic controller 14 controls the suspension SU so that reduction in impact received by the wheel W from the ground is increased. Specifically, in a case where the third predetermined condition is satisfied, the electronic controller 14 controls the suspension SU so that the movement state of the suspension SU is changed from the locked state to the unlocked state or so that the travel amount of the suspension SU is increased. The locked state of the suspension SU restricts movement of the wheel W relative to the frame A1. The unlocked state of the suspension SU allows the wheel W to move relative to the frame A1. For example, in a case where at least one of a twenty-third and twenty-fourth condition is satisfied, the electronic controller 14 determines that the third predetermined condition is satisfied. In a case where the third predetermined condition is satisfied and then the third predetermined condition becomes unsatisfied, the electronic controller 14 can control the suspension SU so that the reduction level in impact received by the wheel W from the ground is restored.

In a case where the second human-powered vehicle AA travels on an uneven road surface, the electronic controller 14 controls the suspension SU so that reduction in impact received by the wheel W from the ground is increased. In one example, in a case where it is determined that the second human-powered vehicle AA travels on an uneven road surface, the electronic controller 14 determines that at least one of the twenty-third and twenty-fourth conditions is satisfied. In a case where the vertical acceleration of the second human-powered vehicle AA is greater than or equal to the predetermined vertical acceleration, the electronic controller 14 determines that the twenty-third condition is satisfied. In a case where the unevenness of the road surface is greater than or equal to the predetermined unevenness, the electronic controller 14 determines that the twenty-fourth condition is satisfied.

In the fifth example, the electronic controller 14 controls the first electric component CO1 in the same manner as the third example described above. In the present embodiment, in a case where the inter-vehicle distance VD is less than the predetermined distance, the electronic controller 14 controls the suspension SU of the first electric component CO1 so that the suspension SU of the first electric component CO1 acts in the same manner as the suspension SU of the second electric component CO2 at the same timing as the suspension SU of the second electric component CO2 acts. In the present embodiment, the electronic controller 14 controls the suspension SU in accordance with each of the fourth example and the fifth example that are described above.

An example of control executed by the control device 12 will now be described with reference to FIG. 7. The control device 12 is paired with the control device 22 of the second human-powered vehicle AA in advance. In the flowchart shown in FIG. 7, the same process as the process of steps S11, S12, and S14 shown in FIG. 6 is executed. The overlaps with the flowchart shown in FIG. 6 will not be described in detail below.

In a case where the affirmative determination is made in step S12, the electronic controller 14 proceeds to step S23. In step S23, the electronic controller 14 controls the suspension SU of the first human-powered vehicle A so that the suspension SU of the first human-powered vehicle A acts in the same manner as the suspension SU of the second human-powered vehicle AA. After step S14 is completed, the electronic controller 14 proceeds to step S25.

In step S25, the electronic controller 14 determines whether or not the third predetermined condition is satisfied. In a case where it is determined in step S25 that the third predetermined condition is not satisfied, the electronic controller 14 returns to step S11. In a case where it is determined in step S25 that the third predetermined condition is satisfied, the electronic controller 14 proceeds to step S26. In step S26, the electronic controller 14 controls the suspension SU so that reduction in impact received by the wheel W from the ground is increased. Specifically, the electronic controller 14 controls the suspension SU so that reduction in impact received by the wheel W from the ground is increased at the timing set in step S14.

Figure 7:
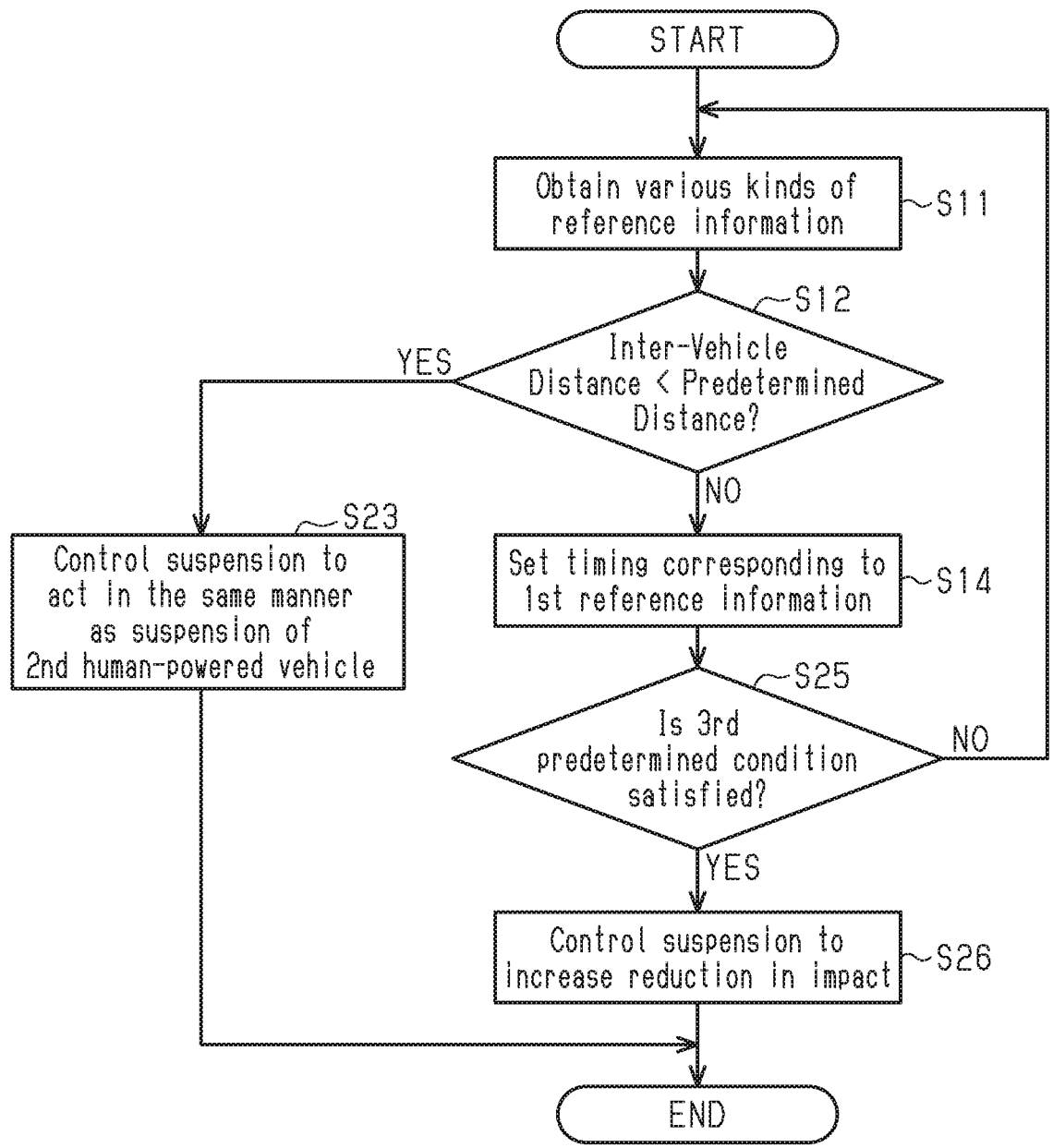
FIG. 7 is a flowchart showing an example of control executed by the electronic controller of the control system in accordance with a second embodiment.

The above-described process completes the process in the flowchart shown in FIG. 7. For example, while the first human-powered vehicle A is traveling, the electronic controller 14 repeatedly executes the process in the flowchart shown in FIG. 7. In the present embodiment, while the first human-powered vehicle A is traveling, the electronic controller 14 concurrently and sequentially executes the process in the flowchart shown in FIG. 7. Steps S12 and S23 can be omitted from the process in the flowchart shown in FIG. 7.

Third Embodiment

A third embodiment of the control system 10 will now be described with reference to FIG. 8. The same reference characters are given to those elements that are the same as the corresponding elements of the first embodiment. Such elements will not be described in detail.

The first electric component CO1 of the third embodiment includes the adjustable seatpost ASP instead of or in addition to at least one of the transmission T and the suspension SU. The electronic controller 14 controls the adjustable seatpost ASP, for example, in accordance with at least one of sixth to eighth examples described below.

In the sixth example, in a case where the fourth predetermined condition related to the first reference information IR1 is satisfied, the electronic controller 14 controls the adjustable seatpost ASP so that the height of the saddle SD with respect to the frame A1 is increased. For example, in a case where at least one of twenty-fifth to twenty-seventh conditions is satisfied, the electronic controller 14 determines that the fourth predetermined condition is satisfied. In a case where the fourth predetermined condition is satisfied and then the fourth predetermined condition becomes unsatisfied, the electronic controller 14 can control the adjustable seatpost ASP so that the height of the saddle SD with respect to the frame A1 is restored.

In a case where the second human-powered vehicle AA travels uphill, the electronic controller 14 controls the adjustable seatpost ASP so that the height of the saddle SD with respect to the frame A1 is increased. In one example, in a case where it is determined that the second human-powered vehicle AA travels uphill, the electronic controller 14 determines that at least one of the twenty-fifth to twenty-seventh conditions is satisfied. In a case where torque is greater than or equal to a second torque, the electronic controller 14 determines that the twenty-fifth condition is satisfied. In a case where pitch of the second human-powered vehicle AA is greater than or equal to a second pitch, the electronic controller 14 determines that the twenty-sixth condition is satisfied. In a case where the gradient of a road surface is greater than or equal to a second gradient, the electronic controller 14 determines that the twenty-seventh condition is satisfied.

In the seventh example, in a case where the fifth predetermined condition related to the first reference information IR1 is satisfied, the electronic controller 14 controls the adjustable seatpost ASP so that the height of the saddle SD with respect to the frame A1 is decreased. For example, in a case where at least one of twenty-eighth to thirtieth conditions is satisfied, the electronic controller 14 determines that the fifth predetermined condition is satisfied. In a case where the fifth predetermined condition is satisfied and then the fifth predetermined condition becomes unsatisfied, the electronic controller 14 can control the adjustable seatpost ASP so that the height of the saddle SD with respect to the frame A1 is restored.

In a case where the second human-powered vehicle AA travels downhill, the electronic controller 14 controls the adjustable seatpost ASP so that the height of the saddle SD with respect to the frame A1 is decreased. In one example, in a case where it is determined that the second human-powered vehicle AA travels downhill, the electronic controller 14 determines that at least one of the twenty-eighth to thirtieth conditions is satisfied. In a case where torque is less than the first torque, the electronic controller 14 determines that the twenty-eighth condition is satisfied. In a case where pitch of the second human-powered vehicle AA is less than the first pitch, the electronic controller 14 determines that the twenty-ninth condition is satisfied. In a case where the gradient of the road surface is less than the first gradient, the electronic controller 14 determines that the thirtieth condition is satisfied.

In the eighth example, the electronic controller 14 controls the first electric component CO1 in the same manner as the third example described above. In the present embodiment, in a case where the inter-vehicle distance VD is less than the predetermined distance, the electronic controller 14 controls the adjustable seatpost ASP of the first electric component CO1 so that the adjustable seatpost ASP of the first electric component CO1 acts in the same manner as the adjustable seatpost ASP of the second electric component CO2 at the same timing as the adjustable seatpost ASP of the second electric component CO2 acts. In the present embodiment, the electronic controller 14 controls the adjustable seatpost ASP in accordance with each of the sixth example, the seventh example, and the eighth example that are described above.

An example of control executed by the control device 12 will now be described with reference to FIG. 8. The control device 12 is paired with the control device 22 of the second human-powered vehicle AA in advance. In the flowchart shown in FIG. 8, the same process as the process of steps S11, S12, and S14 shown in FIG. 6 is executed. The overlaps with the flowchart shown in FIG. 6 will not be described in detail below.

In a case where the affirmative determination is made in step S12, the electronic controller 14 proceeds to step S33. In step S33, the electronic controller 14 controls the adjustable seatpost ASP of the first human-powered vehicle A so that the adjustable seatpost ASP of the first human-powered vehicle A acts in the same manner as the adjustable seatpost ASP of the second human-powered vehicle AA. After step S14 is completed, the electronic controller 14 proceeds to step S35.

In step S35, the electronic controller 14 determines whether or not the fourth predetermined condition is satisfied. In a case where it is determined in step S35 that the fourth predetermined condition is satisfied, the electronic controller 14 proceeds to step S36. In step S36, the electronic controller 14 controls the adjustable seatpost ASP so that the height of the saddle SD with respect to the frame A1 is increased. Specifically, the electronic controller 14 controls the adjustable seatpost ASP so that the height of the saddle SD with respect to the frame A1 is increased at the timing set in step S14.

In a case where it is determined in step S35 that the fourth predetermined condition is not satisfied, the electronic controller 14 proceeds to step S37. In step S37, the electronic controller 14 determines whether or not the fifth predetermined condition is satisfied. In a case where it is determined in step S37 that the fifth predetermined condition is not satisfied, the electronic controller 14 returns to step S11. In a case where it is determined in step S37 that the fifth predetermined condition is satisfied, the electronic controller 14 proceeds to step S38. In step S38, the electronic controller 14 controls the adjustable seatpost ASP so that the height of the saddle SD with respect to the frame A1 is decreased. Specifically, the electronic controller 14 controls the adjustable seatpost ASP so that the height of the saddle SD with respect to the frame A1 is decreased at the timing set in step S14.

Figure 8:
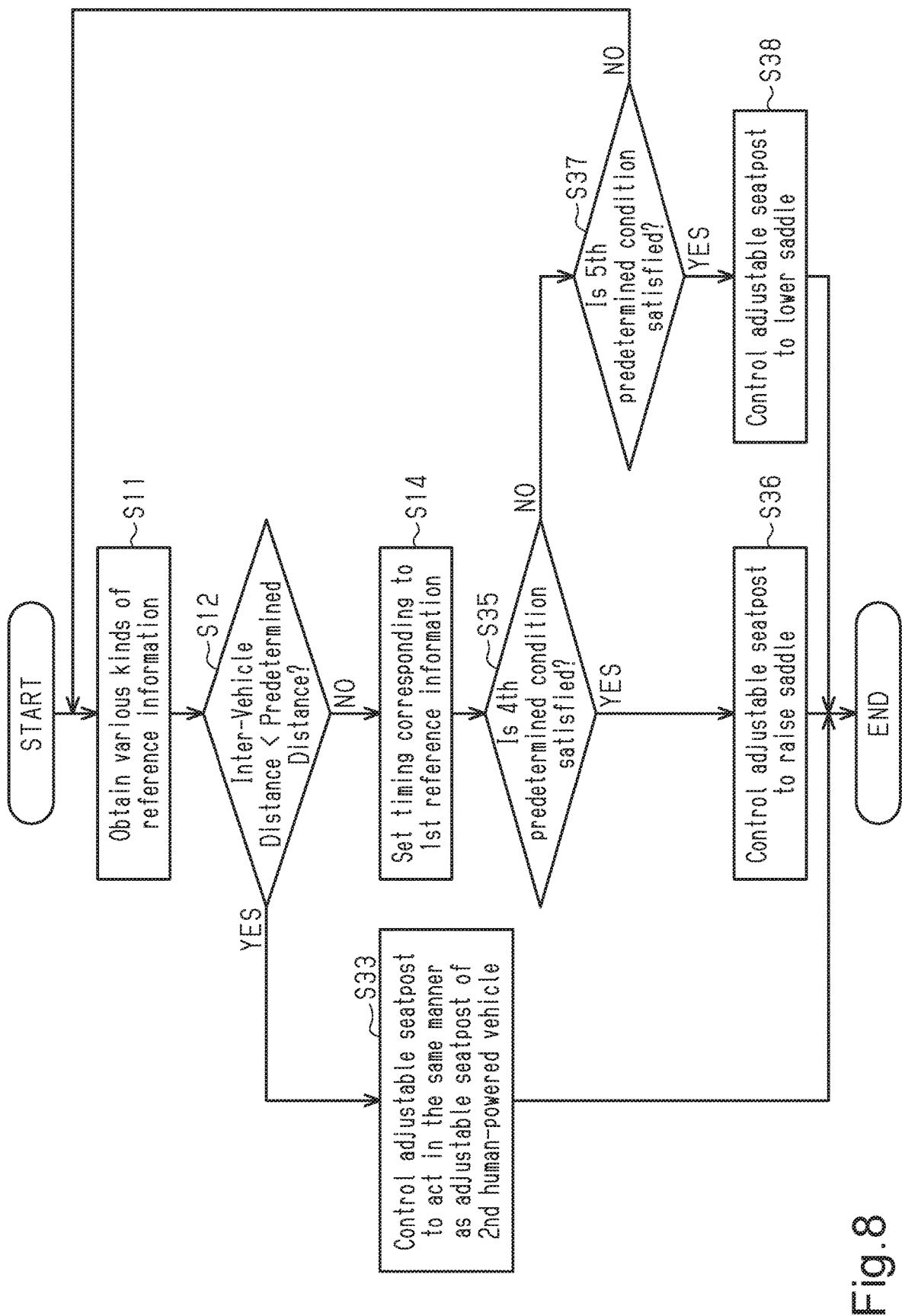
FIG. 8 is a flowchart showing an example of control executed by the electronic controller of the control system in accordance with a third embodiment.

The above-described process completes the process in the flowchart shown in FIG. 8. For example, while the first human-powered vehicle A is traveling, the electronic controller 14 repeatedly executes the process in the flowchart shown in FIG. 8. In the present embodiment, while the first human-powered vehicle A is traveling, the electronic controller 14 concurrently and sequentially executes the process in the flowchart shown in FIG. 8. Steps S12 and S33 can be omitted from the process in the flowchart shown in FIG. 8.

Fourth Embodiment

A fourth embodiment of the control system 10 will now be described with reference to FIG. 9. The same reference characters are given to those elements that are the same as the corresponding elements of the first embodiment. Such elements will not be described in detail.

The first electric component CO1 of the fourth embodiment includes the electric assist unit E instead of or in addition to at least one of the transmission T, the suspension SU, and the adjustable seatpost ASP. The electronic controller 14 controls the electric assist unit E, for example, in accordance with at least one of ninth to eleventh examples described below.

In the ninth example, in a case where a sixth predetermined condition related to the first reference information IR1 is satisfied, the electronic controller 14 controls the electric assist unit E so that the assisting force of the first human-powered vehicle A increases. Specifically, in a case where the second predetermined condition is satisfied, the electronic controller 14 controls the electric assist unit E so that the assist ratio of the first human-powered vehicle A is increased or changes the assist mode so that the assist ratio of the first human-powered vehicle A is increased. The assist ratio is a ratio of human driving force to output of the electric motor E1. For example, in a case where at least one of thirty-first to thirty-third conditions is satisfied, the electronic controller 14 determines that the sixth predetermined condition is satisfied. In a case where the sixth predetermined condition is satisfied and then the sixth predetermined condition becomes unsatisfied, the electronic controller 14 can control the electric assist unit E so that the assisting force of the first human-powered vehicle A is restored.

In a case where the second human-powered vehicle AA travels uphill, the electronic controller 14 controls the electric assist unit E so that the assisting force of the first human-powered vehicle A increases. In one example, in a case where it is determined that the second human-powered vehicle AA travels uphill, the electronic controller 14 determines that at least one of the thirty-first to thirty-third conditions is satisfied. In a case where torque is greater than or equal to a second torque, the electronic controller 14 determines that the thirty-first condition is satisfied. In a case where pitch of the second human-powered vehicle AA is greater than or equal to a second pitch, the electronic controller 14 determines that the thirty-second condition is satisfied. In a case where the gradient of a road surface is greater than or equal to the second gradient, the electronic controller 14 determines that the thirty-third condition is satisfied.

In the tenth example, in a case where a seventh predetermined condition related to the first reference information IR1 is satisfied, the electronic controller 14 controls the electric assist unit E so that the assisting force of the first human-powered vehicle A decreases. For example, in a case where at least one of thirty-fourth to thirty-sixth conditions is satisfied, the electronic controller 14 determines that the seventh predetermined condition is satisfied. In a case where the seventh predetermined condition is satisfied and then the seventh predetermined condition becomes unsatisfied, the electronic controller 14 can control the electric assist unit E so that the assisting force of the first human-powered vehicle A is restored.

In a case where the second human-powered vehicle AA travels downhill, the electronic controller 14 controls the electric assist unit E so that the assisting force of the first human-powered vehicle A decreases. In one example, in a case where it is determined that the second human-powered vehicle AA travels downhill, the electronic controller 14 determines that at least one of the thirty-fourth to thirty-sixth conditions is satisfied. In a case where torque is less than the first torque, the electronic controller 14 determines that the thirty-fourth condition is satisfied. In a case where pitch of the second human-powered vehicle AA is less than the first pitch, the electronic controller 14 determines that the thirty-fifth condition is satisfied. In a case where the gradient of the road surface is less than the first gradient, the electronic controller 14 determines that the thirty-sixth condition is satisfied.

In the eleventh example, the electronic controller 14 controls the first electric component CO1 in the same manner as the third example described above. In the present embodiment, in a case where the inter-vehicle distance VD is less than the predetermined distance, the electronic controller 14 controls the electric assist unit E of the first electric component CO1 so that the electric assist unit E of the first electric component CO1 acts in the same manner as the electric assist unit E of the second electric component CO2 at the same time as the electric assist unit E of the second electric component CO2 acts. The action of the electric assist unit E does not include an action of the electric motor E1 in accordance with human driving force. In the present embodiment, the electronic controller 14 controls the electric assist unit E in accordance with each of the ninth example, the tenth example, and the eleventh example that are described above.

An example of control executed by the control device 12 will now be described with reference to FIG. 9. The control device 12 is paired with the control device 22 of the second human-powered vehicle AA in advance. In the flowchart shown in FIG. 9, the same process as the process of steps S11, S12, and S14 shown in FIG. 6 is executed. The overlaps with the flowchart shown in FIG. 6 will not be described in detail below.

In a case where the affirmative determination is made in step S12, the electronic controller 14 proceeds to step S43. In step S43, the electronic controller 14 controls the electric assist unit E of the first human-powered vehicle A so that the electric assist unit E of the first human-powered vehicle A acts in the same manner as the electric assist unit E of the second human-powered vehicle AA. After step S14 is completed, the electronic controller 14 proceeds to step S45.

In step S45, the electronic controller 14 determines whether or not the sixth predetermined condition is satisfied. In a case where it is determined in step S45 that the sixth predetermined condition is satisfied, the electronic controller 14 proceeds to step S46. In step S46, the electronic controller 14 controls the electric assist unit E so that the assisting force of the first human-powered vehicle A increases. Specifically, the electronic controller 14 controls the electric assist unit E so that the assisting force of the first human-powered vehicle A increases at the timing set in step S14.

In a case where it is determined in step S45 that the sixth predetermined condition is not satisfied, the electronic controller 14 proceeds to step S47. In step S47, the electronic controller 14 determines whether or not the seventh predetermined condition is satisfied. In a case where it is determined in step S47 that the seventh predetermined condition is not satisfied, the electronic controller 14 returns to step S11. In a case where it is determined in step S47 that the seventh predetermined condition is satisfied, the electronic controller 14 proceeds to step S48. In step S48, the electronic controller 14 controls the electric assist unit E so that the assisting force of the first human-powered vehicle A decreases. Specifically, the electronic controller 14 controls the electric assist unit E so that the assisting force of the first human-powered vehicle A decreases at the timing set in step S14.

Figure 9:
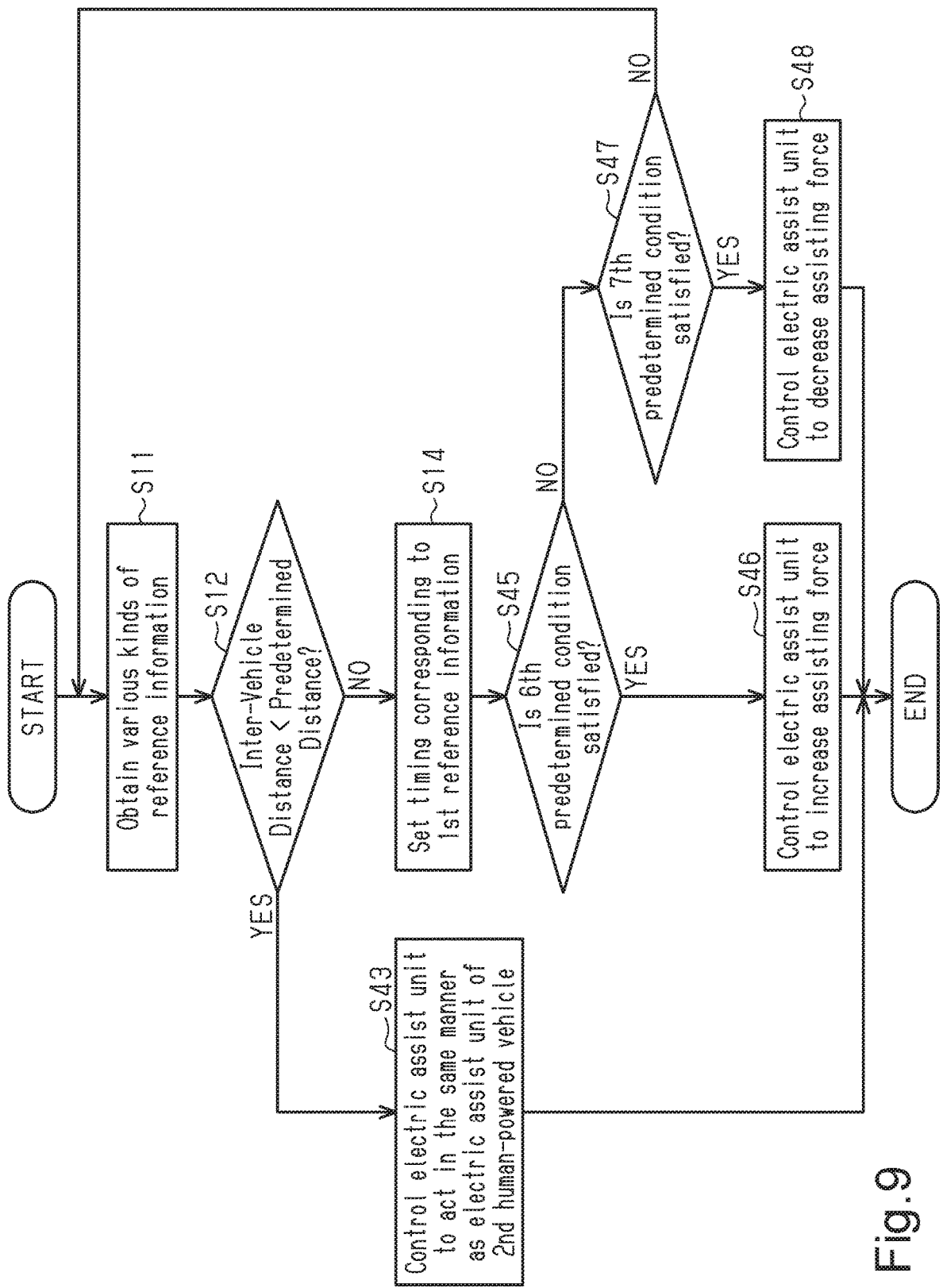
FIG. 9 is a flowchart showing an example of control executed by the electronic controller of the control system in accordance with a fourth embodiment

The above-described process completes the process in the flowchart shown in FIG. 9. For example, while the first human-powered vehicle A is traveling, the electronic controller 14 repeatedly executes the process in the flowchart shown in FIG. 9. In the present embodiment, while the first human-powered vehicle A is traveling, the electronic controller 14 concurrently and sequentially executes the process in the flowchart shown in FIG. 9. Steps S12 and S43 can be omitted from the process in the flowchart shown in FIG. 9.

Fifth Embodiment

A fifth embodiment of the control system 10 will now be described with reference to FIG. 10. The same reference characters are given to those elements that are the same as the corresponding elements of the first embodiment. Such elements will not be described in detail.

The first electric component CO1 of the fifth embodiment includes the brake device BD instead of or in addition to at least one of the transmission T, the suspension SU, the adjustable seatpost ASP, and the electric assist unit E. The electronic controller 14 controls the brake device BD, for example, in accordance with at least one of a twelfth example and a thirteenth example described below.

In the twelfth example, in a case where an eighth predetermined condition related to the first reference information IR1 is satisfied, the electronic controller 14 controls the brake device BD so that the wheel W is braked. For example, in a case where at least one of a thirty-seventh and thirty-eighth condition is satisfied, the electronic controller 14 determines that the eighth predetermined condition is satisfied. In a case where the eighth predetermined condition is satisfied and then the eighth predetermined condition becomes unsatisfied, the electronic controller 14 can control the brake device BD so that the wheel W is not braked. In a case where the eighth predetermined condition is satisfied, the electronic controller 14 can control the brake device BD so that braking force is increased in accordance with an operation amount of the brake operating device BL. In this case, in a case where the eighth predetermined condition is satisfied and then the eighth predetermined condition becomes unsatisfied, the electronic controller 14 can control the brake device BD so that the braking force is reduced.

In a case where the second human-powered vehicle AA travels along an uneven road surface, the electronic controller 14 controls the brake device BD so that the wheel W is braked. In one example, in a case where it is determined that the second human-powered vehicle AA travels on an uneven road surface, the electronic controller 14 determines that at least one of the thirty-seventh and thirty-eighth conditions is satisfied. In a case where the vertical acceleration of the second human-powered vehicle AA is greater than or equal to the predetermined vertical acceleration, the electronic controller 14 determines that the thirty-seventh condition is satisfied. In a case where the unevenness of the road surface is greater than or equal to the predetermined unevenness, the electronic controller 14 determines that the thirty-eighth condition is satisfied.

In the thirteenth example, the electronic controller 14 controls the first electric component CO1 in the same manner as the third example described above. In the present embodiment, in a case where the inter-vehicle distance VD is less than the predetermined distance, the electronic controller 14 controls the brake device BD of the first electric component CO1 so that the brake device BD of the first electric component CO1 acts in the same manner as the brake device BD of the second electric component CO2 at the same timing as the brake device BD of the second electric component CO2 acts. In the present embodiment, the electronic controller 14 controls the brake device BD in accordance with each of the twelfth example and the thirteenth example that are described above.

An example of control executed by the control device 12 will now be described with reference to FIG. 10. The control device 12 is paired with the control device 22 of the second human-powered vehicle AA in advance. In the flowchart shown in FIG. 10, the same process as the process of steps S11, S12, and S14 shown in FIG. 6 is executed. The overlaps with the flowchart shown in FIG. 6 will not be described in detail below.

In a case where the affirmative determination is made in step S12, the electronic controller 14 proceeds to step S53. In step S53, the electronic controller 14 controls the brake device BD of the first human-powered vehicle A so that the brake device BD of the first human-powered vehicle A acts in the same manner as the brake device BD of the second human-powered vehicle AA. After step S14 is completed, the electronic controller 14 proceeds to step S55.

In step S55, the electronic controller 14 determines whether or not the eighth predetermined condition is satisfied. In a case where it is determined in step S55 that the eighth predetermined condition is not satisfied, the electronic controller 14 returns to step S11. In a case where it is determined in step S55 that the eighth predetermined condition is satisfied, the electronic controller 14 proceeds to step S56. In step S56, the electronic controller 14 controls the brake device BD so that the wheel W is braked. Specifically, the electronic controller 14 controls the brake device BD so that the wheel W is braked at the timing set in step S14.

Figure 10:
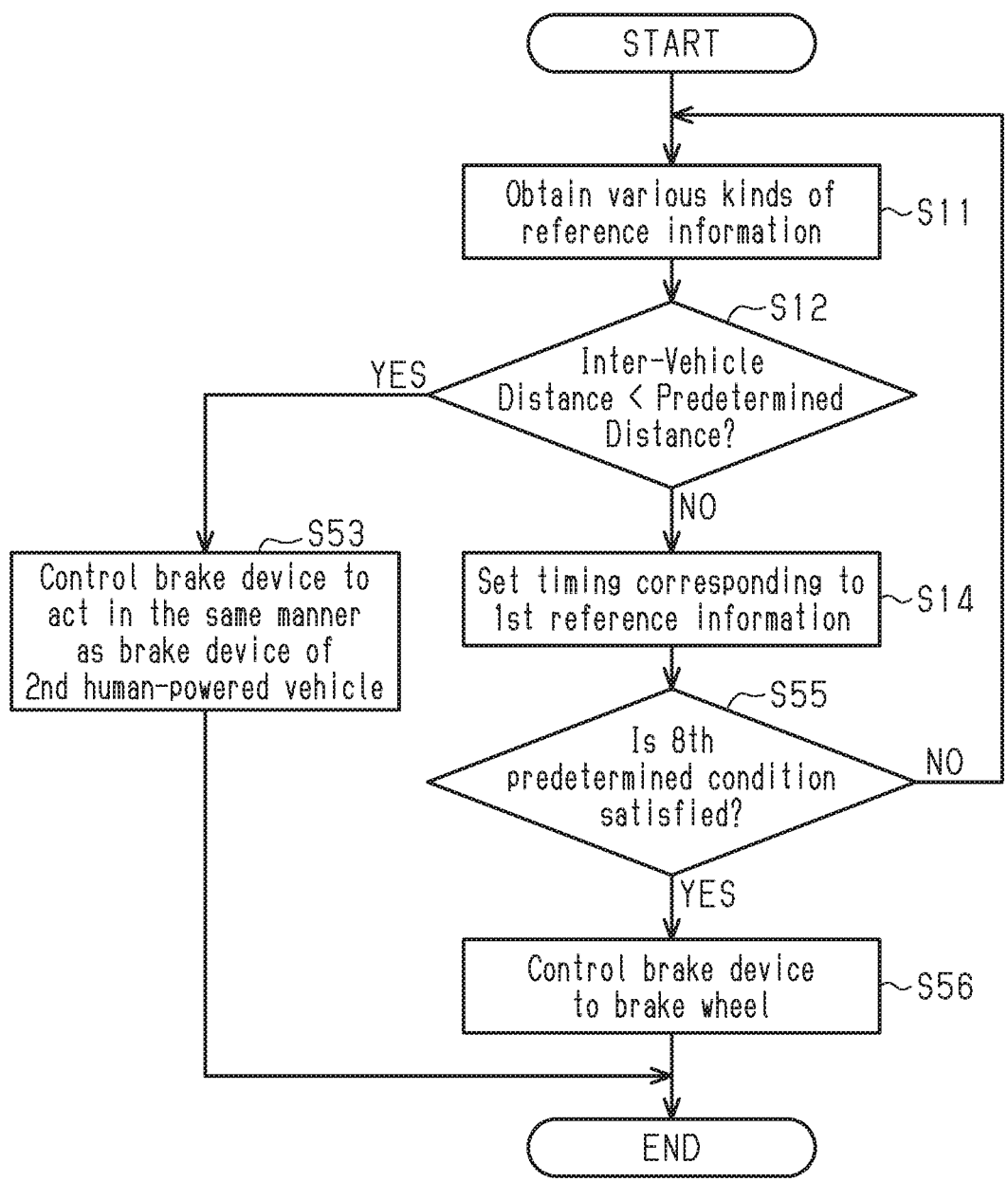
FIG. 10 is a flowchart showing an example of control executed by the electronic controller of the control system in accordance with a fifth embodiment.

The above-described process completes the process in the flowchart shown in FIG. 10. For example, while the first human-powered vehicle A is traveling, the electronic controller 14 repeatedly executes the process in the flowchart shown in FIG. 10. In the present embodiment, while the first human-powered vehicle A is traveling, the electronic controller 14 concurrently and sequentially executes the process in the flowchart shown in FIG. 10. Steps S12 and S53 can be omitted from the process in the flowchart shown in FIG. 10.

Modifications

The description related to the above embodiments exemplifies, without any intention to limit, applicable forms of a control device and a control system according to the present disclosure. The control device and the control system according to the present disclosure can be applied to, for example, modifications of the embodiments that are described below and combinations of at least two of the modifications that do not contradict each other. In the following modifications, the same reference characters are given to those elements that are the same as the corresponding elements of the above embodiments. Such elements will not be described in detail.

The control executed by the electronic controller 14 can be changed in any manner. In a first example, in a case where the first predetermined condition is satisfied, the electronic controller 14 controls the transmission T so that the transmission ratio of the first human-powered vehicle A decreases. In a second example, in a case where the second predetermined condition is satisfied, the electronic controller 14 controls the transmission T so that the transmission ratio of the first human-powered vehicle A increases. In a third example, in a case where the third predetermined condition is satisfied, the electronic controller 14 controls the suspension SU so that reduction in impact received by the wheel W from the ground is decreased. Specifically, in a case where the third predetermined condition is satisfied, the electronic controller 14 controls the suspension SU so that the movement state of the suspension SU is changed from the unlocked state to the locked state or so that the travel amount of the suspension SU is decreased. In a fourth example, in a case where the fourth predetermined condition is satisfied, the electronic controller 14 controls the adjustable seatpost ASP so that the height of the saddle SD with respect to the frame A1 is decreased. In a fifth example, in a case where the fifth predetermined condition is satisfied, the electronic controller 14 controls the adjustable seatpost ASP so that the height of the saddle SD with respect to the frame A1 is increased. In a sixth example, in a case where the sixth predetermined condition is satisfied, the electronic controller 14 controls the electric assist unit E so that the assisting force of the first human-powered vehicle A decreases. In a seventh example, in a case where the seventh predetermined condition is satisfied, the electronic controller 14 controls the electric assist unit E so that the assisting force of the first human-powered vehicle A increases. In an eighth example, in a case where the eighth predetermined condition is satisfied, the electronic controller 14 controls the brake device BD so that the wheel W is quickly braked.

The control executed by the electronic controllers 14 and 24 can be changed in any manner. In one example, the electronic controller 24 of the second human-powered vehicle AA produces a control instruction related to control of the first electric component CO1 based on the first reference information IR1 obtained from the second detector DB. The electronic controller 24 causes the transmitter 28 to transmit information related to the produced control instruction. The electronic controller 14 of the first human-powered vehicle A obtains the information related to the control instruction via the transmitter 28 and the receiver 18 and controls the first electric component CO1 based on the control instruction. In a case where the transmitter 28 is further mounted on the first human-powered vehicle A and the receiver 18 is further mounted on the second human-powered vehicle AA, the electronic controller 24 can further produce a control instruction related to a timing corresponding to the first reference information IR1 based on information obtained from the first detector DA.

The content included in the first reference information IR1 can be changed in any manner. In one example, the first reference information IR1 includes rider information related to the rider of the second human-powered vehicle AA instead of or in addition to at least one of the traveling information, the environment information, the handling information, and the action information. The rider information includes at least one of heart rate, muscle potential, perspiration amount, and body temperature. For example, in a case where a value related to the rider information is increased, the electronic controller 14 can control the transmission T so that the transmission ratio of the first human-powered vehicle A increases or can control the electric assist unit E so that the assisting force of the first human-powered vehicle A increases. For example, in a case where the value related to the rider information is decreased, the electronic controller 14 can control the transmission T so that the transmission ratio of the first human-powered vehicle A decreases or can control the electric assist unit E so that the assisting force of the first human-powered vehicle A decreases.

The type of the first human-powered vehicle A can be changed in any manner. In a first example, the first human-powered vehicle A is a road bike, a mountain bike, a cross bike, a city bike, a cargo bike, or a recumbent bike. In a second example, the first human-powered vehicle A is a kick scooter. The second human-powered vehicle AA can be modified in the same manner.

The type of the vehicle V can be changed in any manner. In a first example, the vehicle V includes vehicles such as a two-wheeled motorcycle and a four-wheeled motorcycle. In a second example, the vehicle V includes an electric two-wheeled standing vehicle.

The relationship between the first human-powered vehicle A and the vehicle V can be changed in any manner. In one example, the vehicle V is a vehicle traveling behind the first human-powered vehicle A. The vehicle V is a vehicle following the first human-powered vehicle A. For example, in a case where the vehicle speed of the vehicle V is decreased, the electronic controller 14 can control the transmission T so that the transmission ratio of the first human-powered vehicle A decreases or can control the electric assist unit E so that the assisting force of the first human-powered vehicle A decreases. In this specification, sentences including the phrase of "at least one of" can be interpreted as follows. In one example, if a sentence indicates two choices, the sentence means to include "only one of the choices" or "both of the choices". In another example, if a sentence indicates three or more choices, the sentence means to include "only one of the choices" or "any combination of two or more of the choices".

What is claimed is:

1. A control system comprising:
   an electronic controller configured to control a first electric component of a first human-powered vehicle, the first electric component includes a transmission and at least one of a suspension, an adjustable seatpost, an electric assist unit, and a brake device; and
   a receiver configured to receive first reference information related to a vehicle including a second human-powered vehicle that differs from the first human-powered vehicle and that is traveling ahead of the first human-powered vehicle,
the electronic controller being configured to control the first electric component based on the first reference information,
the first reference information including traveling information related to a traveling state of the second human-powered vehicle, the traveling information including at least one of drive information and behavior information,
the drive information including at least one of cadence, torque acting on a crank of the second human-powered vehicle, vehicle speed, traveling acceleration, and power, and
the behavior information including at least one of vertical acceleration of the second human-powered vehicle, yaw of the second human-powered vehicle, roll of the second human-powered vehicle, and pitch of the second human-powered vehicle.

2. The control system according to claim 1, wherein the electronic controller is configured to control the transmission so that a transmission ratio of the first human-powered vehicle increases as a value related to the drive information increases.

3. The control system according to claim 1, wherein the electronic controller is configured to control the transmission so that a transmission ratio of the first human-powered vehicle decreases as a value related to the drive information decreases.

4. The control system according to claim 1, wherein the first reference information includes environment information related to a traveling environment of the second human-powered vehicle.

5. The control system according to claim 1, wherein the first reference information includes handling information related to operation of a handlebar of the second human-powered vehicle.

6. The control system according to claim 5, wherein the electronic controller is configured to control the transmission so that a transmission ratio of the first human-powered vehicle decreases in a case where an operation amount of the handlebar of the second human-powered vehicle is larger than or equal to a predetermined operation amount.

7. The control system according to claim 1, wherein the first reference information includes action information related to an action of a second electric component of the second human-powered vehicle.

8. The control system according to claim 7, wherein the electronic controller is configured to control the first electric component based on the action information so that the first electric component acts in the same manner as the second electric component.

9. The control system according to claim 8, wherein the electronic controller is configured to control the first electric component in accordance with a timing at which the second electric component acts in a case where an inter-vehicle distance between the first human-powered vehicle and the second human-powered vehicle is shorter than a predetermined distance.

10. The control system according to claim 1, wherein the electronic controller is configured to control the first electric component based on the first reference information and second reference information, and
the second reference information includes at least one of inter-vehicle information related to an inter-vehicle distance between the first human-powered vehicle and the second human-powered vehicle and history information related to a traveling history of the second human-powered vehicle.

11. A control system comprising:
an electronic controller configured to control a first electric component of a first human-powered vehicle, the first electric component including a transmission and at least one of a suspension, an adjustable seatpost, an electric assist unit, and a brake device; and
a receiver configured to receive first reference information related to a vehicle including a second human-powered vehicle that differs from the first human-powered vehicle and that is traveling ahead of the first human-powered vehicle,
the electronic controller being configured to control the first electric component based on the first reference information, wherein the first reference information includes environment information related to a traveling environment of the second human-powered vehicle,
the environment information includes at least one of road surface information related to a condition of a road surface, resistance information related to a traveling resistance of the second human-powered vehicle, weather information related to weather, and temperature information related to temperature.

12. The control system according to claim 11, wherein the road surface information includes at least one of gradient information related to gradient of a road surface and unevenness information related to unevenness of a road surface.

13. The control system according to claim 12, wherein the electronic controller is configured to control the transmission so that a transmission ratio of the first human-powered vehicle decreases in a case where the second human-powered vehicle travels uphill.

14. The control system according to claim 12, wherein the electronic controller is configured to control the transmission so that a transmission ratio of the first human-powered vehicle increases in a case where the second human-powered vehicle travels downhill.

15. The control system according to claim 12, wherein the electronic controller is configured to control the transmission so that a transmission ratio of the first human-powered vehicle decreases in a case where the second human-powered vehicle travels along an uneven road surface.

16. A control system comprising:
an electronic controller configured to control a first electric component of a first human-powered vehicle; and
a receiver configured to receive first reference information related to a vehicle that includes a second human-powered vehicle that differs from the first human-powered vehicle and that is traveling ahead of the first human-powered vehicle,
the electronic controller being configured to control the first electric component based on the first reference information, the electronic controller further being configured to control the first electric component based on the first reference information and second reference information, the second reference information including at least one of inter-vehicle information related to an inter-vehicle distance between the first human-powered vehicle and the second human-powered vehicle and history information related to a traveling history of the second human-powered vehicle, and the electronic controller being configured to control the first electric component based on the first reference information at a timing corresponding to the second reference information.

17. The control system according to claim 16, wherein the electronic controller is configured to set a timing corresponding to the first reference information based on the second reference information and control the first electric component at the timing based on the first reference information.

* * * * *